United States Patent
Saito et al.

(10) Patent No.: US 9,550,874 B2
(45) Date of Patent: Jan. 24, 2017

(54) POWDERED POLYURETHANE UREA RESIN COMPOSITION FOR SLUSH MOLDING AND MANUFACTURING PROCESS THEREFOR

(75) Inventors: Koichi Saito, Kyoto (JP); Ko Kawasaki, Kyoto (JP); Kakuhiro Kawaguchi, Kyoto (JP); Yasuhiro Tsudo, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 14/236,495

(22) PCT Filed: Jul. 30, 2012

(86) PCT No.: PCT/JP2012/069290
§ 371 (c)(1),
(2), (4) Date: Jan. 31, 2014

(87) PCT Pub. No.: WO2013/018747
PCT Pub. Date: Feb. 7, 2013

(65) Prior Publication Data
US 2014/0179864 A1  Jun. 26, 2014

(30) Foreign Application Priority Data

Aug. 2, 2011 (JP) .................. 2011-169555
Sep. 7, 2011 (JP) .................. 2011-194704

(51) Int. Cl.
*B29B 9/12* (2006.01)
*B29B 9/16* (2006.01)
(Continued)

(52) U.S. Cl.
CPC . *C08K 3/04* (2013.01); *B29B 9/12* (2013.01); *B29B 9/16* (2013.01); *B29C 39/00* (2013.01);
(Continued)

(58) Field of Classification Search
CPC ........ B29B 9/12; B29B 2009/125; B29B 9/16; B29B 2009/161; B29B 2009/163; B29B 2009/166; B29C 39/00; B29C 41/16; B29C 41/18; B29C 67/02; B29C 67/06; B29C 67/24; C08G 18/00; C08G 18/06; C08G 18/08; C08G 18/0847; C08G 18/0852; C08G 18/0866; C08G 18/10; C08G 18/12; C08G 18/28; C08G 18/2805; C08G 18/2815; C08G 18/282; C08G 18/30; C08G 18/32; C08G 18/3203; C08G 18/3225; C08G 18/3814; C08G 18/40; C08G 18/42; C08G 18/4202; C08G 18/65; C08G 18/6505; C08G 18/6511; C08G 18/6523; C08G 18/6529; C08G 18/66; C08G 18/6603; C08G 18/6607; C08G 18/6614; C08G 18/6618; C08G 18/6633; C08G 18/6637; C08G 18/664; C08G 18/6648; C08G 18/6651;
C08G 18/82; C08G 18/73; C08G 18/2825; C08G 18/4211; C08G 18/4213; C08G 18/4238; C08G 2140/00; C08J 3/00; C08J 3/03; C08J 3/09; C08J 3/12; C08J 3/124; C08J 3/203; C08J 5/00; C08J 5/02; C08J 7/08; C08J 2375/00; C08J 2375/02; C08J 2375/06; C08J 2475/00; C08J 2475/02; C08J 2475/06; C08K 3/00; C08K 3/04; C08K 5/00; C08K 5/10; C08K 5/12; C08K 5/20; C08K 2201/013; C08L 75/00; C08L 75/02; C08L 75/06
(Continued)

(56) References Cited

U.S. PATENT DOCUMENTS 3,493,543 A * 2/1970 Nazy et al. .................. 528/67
2007/0048643 A1 * 3/2007 Kmiecik-Lawrynowicz et al. .................. 430/108.6

FOREIGN PATENT DOCUMENTS

CN 1662584 A 8/2005
EP 2511313 * 10/2012
(Continued)

OTHER PUBLICATIONS

Machine English translation of JP 2007-246676, Hirai et al., Sep. 2007.*
(Continued)

*Primary Examiner* — Patrick Niland
(74) *Attorney, Agent, or Firm* — Locke Lord LLP; James E. Armstrong, IV; Nicolas J. DiCeglie, Jr.

(57) ABSTRACT

Provided are: a powdered material for slush molding; and a manufacturing process therefor. The powdered material is less odorous, exhibits excellent powder fluidity, and does not suffer from troubles resulting from the sliding-down or agglomeration of a pigment even when the resin particles have been pigmented on the surfaces thereof. Thus, the powdered material ensures high productivity. The powdered material is a powdered polyurethane urea resin composition which comprises (D) a polyurethane urea resin that has a total content of bimolecular condensate of acetone, bimolecular condensate of methyl ethyl ketone, and bimolecular condensate of methyl isobutyl ketone of 1,000 ppm or less and (N) an additive, wherein the polyurethane urea resin (D) takes the form of thermoplastic polyurethane urea resin particles (P) that have a volume-mean particle diameter of 20 to 500 μm and that have protrusions and recesses on the surfaces. The powdered polyurethane urea resin composition is manufactured by a manufacturing process which includes a step of mixing (A) an isocyanato-terminated urethane prepolymer with (B) an alicyclic diamine and/or an aliphatic diamine in an aqueous medium by stirring to form the resin particles (P).

7 Claims, No Drawings

(51) Int. Cl.
| | |
|---|---|
| *B29C 39/00* | (2006.01) |
| *B29C 41/16* | (2006.01) |
| *B29C 41/18* | (2006.01) |
| *B29C 67/02* | (2006.01) |
| *B29C 67/06* | (2006.01) |
| *B29C 67/24* | (2006.01) |
| *C08K 3/04* | (2006.01) |
| *C08G 18/00* | (2006.01) |
| *C08G 18/06* | (2006.01) |
| *C08G 18/08* | (2006.01) |
| *C08G 18/10* | (2006.01) |
| *C08G 18/12* | (2006.01) |
| *C08G 18/28* | (2006.01) |
| *C08G 18/42* | (2006.01) |
| *C08G 18/73* | (2006.01) |

(52) U.S. Cl.
CPC ............... *B29C 41/16* (2013.01); *B29C 41/18* (2013.01); *B29C 67/02* (2013.01); *B29C 67/06* (2013.01); *B29C 67/24* (2013.01); *C08G 18/00* (2013.01); *C08G 18/06* (2013.01); *C08G 18/08* (2013.01); *C08G 18/0847* (2013.01); *C08G 18/0852* (2013.01); *C08G 18/0866* (2013.01); *C08G 18/10* (2013.01); *C08G 18/12* (2013.01); *C08G 18/28* (2013.01); *C08G 18/282* (2013.01); *C08G 18/2805* (2013.01); *C08G 18/2815* (2013.01); *C08G 18/2825* (2013.01); *C08G 18/4202* (2013.01); *C08G 18/4211* (2013.01); *C08G 18/4213* (2013.01); *C08G 18/4238* (2013.01); *C08G 18/73* (2013.01); *B29B 2009/125* (2013.01); *B29B 2009/161* (2013.01); *B29B 2009/163* (2013.01); *B29B 2009/166* (2013.01); *C08G 2140/00* (2013.01)

(58) Field of Classification Search
USPC ...... 264/5, 6, 7, 15, 86, 517, 109, 302, 309, 264/331.19; 524/589, 590, 591, 839, 840; 523/200, 204, 205, 223, 313, 322, 346
See application file for complete search history.

(56) References Cited

FOREIGN PATENT DOCUMENTS

| JP | 2006-188669 | | 7/2006 |
|---|---|---|---|
| JP | 2007204693 | A | 8/2007 |
| JP | 2007-246676 | * | 9/2007 |
| WO | WO 2011/070784 | | 6/2011 |

OTHER PUBLICATIONS

International Search Report in corresponding PCT application No. PCT/JP2012/069290, mailed Nov. 6, 2012 (English translation).
English Translation of the International Search Report and Office Action mailed Nov. 15, 2014, issued for the Chinese patent application No. 201280037337.9.
Second Office Action issued in corresponding Chinese Patent Application No. CN201280037337.9, dated Jul. 1, 2015.

* cited by examiner

POWDERED POLYURETHANE UREA RESIN COMPOSITION FOR SLUSH MOLDING AND MANUFACTURING PROCESS THEREFOR

CROSS-REFERENCE TO RELATED APPLICATIONS

This application is the U.S. national phase application pursuant to 35 U.S.C. §371 of PCT International Patent Application No. PCT/JP2012/069290, filed Jul. 30, 2012, which claims priority to Japanese Patent Application No. 2011-169555, filed Aug. 2, 2011, and Japanese Patent Application No. 2011-194704, filed Sep. 7, 2011. The contents of the foregoing applications are incorporated herein by reference in their entirety.

TECHNICAL FIELD

The present invention relates to a powdery resin composition for slush molding using polyurethane urea resin particles having irregular surfaces, that is, having protrusions and recesses on the surfaces, and a method for the production thereof.

BACKGROUND ART

The powder molding method has recently been used widely for applications typified by automotive interior materials, adhesives for interlining, etc. because of its advantages such as being capable of easily molding products with complicated shapes (undercut, deep drawing, etc.), being capable of making uniform the thickness of products, and being capable of affording high yields of materials.

Although a soft polyvinyl chloride powder has mainly been used for the powder molding method, the plasticizer contained migrates to the surface and impairs the soft feeling if such a powder is used for long term under some environment of use. When an automobile is disposed and then subjected to incineration treatment, hydrogen chloride gas is generated in accordance with the incineration temperature, so that the incineration furnace may be corroded in some cases. For this reason, polyurethane resins have also been used in recent years. While conventional polyurethane resins are high in cost and have environmental problems because they are synthesized in organic solvents, a method for producing a spherical polyurethane resin powder in an aqueous medium has been proposed (see, for example, Patent Document 1).

However, since the polyurethane resin powder produced by the method of Patent Document 1, which is a material excellent as a powder slush material for automotive interior parts, uses a ketimine compound as an extender, such a powder has room for improvement in low odor property relating to vehicle compartment comfortableness, which has recently been increasingly demanded.

In the method of Patent Document 1, since an emulsifier is included in water as a dispersion medium and dispersion is performed with a high shear disperser when dispersing polyurethane resin powder forming components in water, fine particles of several μm and coarse particles of several hundred μm are formed in a small amount. If the resin powder obtained from this dispersion is used directly for a slush molding application, powder flowability deteriorates and pinholes, etc. are formed in the surface of a molded article. For this reason, the resin powder is required to be classified into particle size distribution suitable for the slush molding application.

A material for slush molding which has been colored in order to exhibit high quality feeling is in use as a skin material of an automotive interior component. The material has been colored by synthesizing uncolored particles, and then dusting a colorant such as an inorganic pigment or an organic pigment onto the surfaces of the uncolored particles. If this coloring method is performed using a spherical polyurethane resin powder, however, by shear at the time of stirring and mixing in the step of the coloring or in a step subsequent thereto, pigment particles which adhere onto the resin particle surfaces are slipped down from the surfaces, or the pigment particles aggregate with each other on the particle surfaces. Thus, this method has a problem that the original color of the coloring agent is not expressed and a lump of the pigment is intermingled with the resultant product.

In order to solve such a problem, a method has been proposed in which a colorant is mixed at a stage where the resin is still only a liquid prepolymer before being granulated, and subsequently the mixture is granulated (Patent Document 2). In this method, since pigment particles have been trapped within resin particles, the pigment fails to slip down from resin particles or aggregation of pigment particles on particle surfaces does not occur. As compared with the above-described method of coloring particle surfaces, however, this method is poorer in productivity because it is unavoidable to wash production facilities carefully whenever the color of products is changed.

PRIOR ART DOCUMENTS

Patent Documents

Patent Document 1: JP-A-8-120041
Patent Document 2: WO 2005/097901 pamphlet

SUMMARY OF THE INVENTION

Problems to be Solved by the Invention

The problem to be solved by the present invention is to provide a powdery polyurethane urea resin composition for slush molding and a method for producing the same, the composition being low odor and excellent in powder flowability, having no defects caused by slipping down, aggregation, etc. of a pigment despite being coloring on the surface of the resin particles, and being high in productivity.

Solutions to the Problems

The present inventors studied intensively in order to solve the above-described problems and they have accomplished the present invention. That is, the present invention is:

a powdery polyurethane urea resin composition (C) for slush molding comprising a polyurethane urea resin (D) whose total content of a dicondensate of acetone, a dicondensate of methyl ethyl ketone, and a dicondensate of methyl isobutyl ketone is 1,000 ppm or less, and an additive (N), wherein the polyurethane urea resin (D) has formed thermoplastic polyurethane urea resin particles (P) having irregularities on the surfaces thereof and having a shape factor SF1 of from 101 to 200, a shape factor SF2 of from 120 to 240, and a volume-average particle diameter of from 20 to 500 μm.

The present invention is also a method for producing the powdery polyurethane urea resin composition for slush molding according to any one of claims 1 to 12, the method comprising the step of obtaining thermoplastic polyurethane urea resin particles (P) having irregularities on the surfaces thereof by performing a polymerization reaction, formation of primary particles having a volume-average particle diameter of 0.1 to 60 μm, and granulation by coalescence of the primary particles by mixing and stirring a mixture (M) composed of an alicyclic diamine and/or an aliphatic diamine (B), an organic solvent (K) having a dielectric constant of 5 to 25, and an aqueous solution (L) containing a surfactant, or water, wherein the mixture contains the (K) in an amount of 5 to 30% by weight relative to the (L) or the water, with an isocyanate group-terminated urethane prepolymer (A), wherein an additive (N) is added and mixed in any of the step of obtaining the (P) or the step of obtaining the (A) or the raw material thereof before the step of obtaining the (P), or the step after obtaining the (P).

The present invention is also a method for producing the powdery polyurethane urea resin composition for slush molding according to any one of claims 1 to 12, the method comprising the following step 1 and the following step 2-1 or step 2-2:

Step 1:
the step of producing polyurethane urea resin fine particles (G) having a volume-average particle diameter of 0.1 to 60 μm comprising a polyurethane urea resin (D) whose total content of a dicondensate of acetone, a dicondensate of methyl ethyl ketone, and a dicondensate of methyl isobutyl ketone is 1,000 ppm or less;

Step 2-1:
the step of obtaining thermoplastic polyurethane urea resin particles (P) having irregularities on the surfaces thereof by causing coalescence of the polyurethane urea resin fine particles (G) by heating the (G) to a temperature of from [the thermally softening temperature of the (D)−10]° C. to [the thermally softening temperature of the (D)+10]° C. under stirring at a peripheral speed of 0.5 to 50 m/s;

Step 2-2:
the step of obtaining thermoplastic polyurethane urea resin particles (P) having irregularities on the surfaces thereof by causing coalescence of the (G) by heating the (G) to a temperature of from 70° C. to [the thermally softening temperature of the (D)+10]° C. under stirring at a peripheral speed of 0.5 to 50 m/s in the presence of 5 to 30% by weight, based on the weight of the (G), of an organic solvent (T) having a solubility parameter differing by 3 or less from that of the polyurethane urea resin (D);

wherein an additive (N) is added and mixed in any of the step 1, or the step 2-1 or step 2-2, or the step of obtaining a raw material of the (D) before the step 1, or the step after obtaining the resin particles (P).

The present invention is also a method for producing the powdery polyurethane urea resin composition for slush molding according to any one of claims 1 to 12, the method comprising the following step 3 and step 4:

Step 3:
the step of producing polyurethane urea resin fine particles (G) having a volume-average particle diameter of 0.1 to 60 μm comprising a polyurethane urea resin (D) whose total content of a dicondensate of acetone, a dicondensate of methyl ethyl ketone, and a dicondensate of methyl isobutyl ketone is 1,000 ppm or less, and then producing a slurry (R) comprising the (G) and an aqueous solution (L) containing a surfactant, or water;

Step 4:
the step of obtaining thermoplastic polyurethane urea resin particles (P) having irregularities on the surfaces thereof by causing coalescence of the polyurethane urea resin fine particles (G) by adding an organic solvent (T) having a solubility parameter differing by 3 or less from that of the polyurethane urea resin (D) to the slurry (R) and then stirring at a temperature of 10° C. or higher, preferably 10° C. to [the boiling point of the organic solvent (T)], at a peripheral speed of 0.1 to 10 m/s;

wherein an additive (N) is added and mixed in any of the step 3 or the step 4, or the step of obtaining a raw material of the (D) before the step 3, or a step after obtaining the resin particles (P).

Advantages of the Invention

The powdery polyurethane urea resin composition (C) for slush molding produced by the production method of the present invention is low odor and excellent in powder flowability, has no defects caused by slipping down, aggregation, etc. of a pigment despite being coloring on the surface of the resin particles, and is high in productivity.

MODE FOR CARRYING OUT THE INVENTION

The powdery polyurethane urea resin composition (C) for slush molding of the present invention (hereinafter also referred to as the "polyurethane urea resin composition (C)") comprises a polyurethane urea resin (D) whose total content of a dicondensate of acetone, a dicondensate of methyl ethyl ketone, and a dicondensate of methyl isobutyl ketone is 1,000 ppm or less, and an additive (N), wherein the polyurethane urea resin (D) has formed thermoplastic polyurethane urea resin particles (P) having irregularities on the surface thereof and having a shape factor SF1 of from 101 to 200, a shape factor SF2 of from 120 to 240, and a volume-average particle diameter of from 20 to 500 μm.

The thermoplastic polyurethane urea resin particles (P) have a shape factor SF1 of from 101 to 200, a shape factor SF2 of from 120 to 240.

Since the surface of the thermoplastic polyurethane urea resin particles (P) is irregular, the SF1 of the particles is 101 or more. Particles having a shape factor SF1 of more than 200 have an irregular shape to be deteriorated in powder flowability.

If particles have a shape factor SF2 of less than 120, even when a coloring agent is added to the particles and pigment particles are thereby fixed onto the surface of the particles, the pigment particles on the surface are slipped down by shear generated during stirring in a subsequent step and then the pigment particles aggregate together, so that the inherent color thereof is not developed. If aggregates of pigment particles become larger, the aggregates turn into alien substances to deteriorate the quality of the product. On the other hand, particles having an SF2 of greater than 240 have irregularities on their surface which are excessively fine, so that the pigment is less likely to enter into depressions, resulting in deteriorated pigment dispersion stability.

The shape factor SF1 indicates the roundness of the shape of particles and it is represented by the following formula (1). In the formula, the "longest diameter" is the longest diameter of a figure produced by projecting a polyurethane particle on a two-dimensional plane, and AREA is the area of the figure.

$$SF1 = \{(\text{longest diameter})^2/(\text{AREA})\} \times (100\pi/4) \qquad (1)$$

When the value of the SF1 is 100, the shape of the polyurethane urea resin particle is a complete sphere. As the SF1 value becomes larger, the particle becomes more irregular in shape.

The shape factor SF2 indicates the magnitude of the irregularity of the shape of particles and it is represented by the following formula (2). In the formula, PERI is the peripheral length of a figure produced by projecting a polyurethane urea resin particle on a two-dimensional plane, and AREA is the area of the figure.

$$SF2=\{(PERI)^2/(AREA)\}\times(100/4\pi) \quad (2)$$

When the value of the SF2 is 100, the surface of the polyurethane urea resin particle has no irregularities. As the SF2 value becomes larger, irregularities on the polyurethane urea resin particle surface become more remarkable.

Examples of the method for measuring the shape factors SF1 and SF2 include a method in which a photograph of polyurethane urea resin particles (P) is taken with a scanning electron microscope (e.g., "S-800" manufactured by Hitachi, Ltd.), a microscope ["USB Digital Scale" manufactured by Scalar Corporation], etc., and then the photograph is introduced into and analyzed with an image analyzer (e.g., "LUSEX 3" manufactured by Nireco Corporation); and a method in which the measurement is performed using a flow particle image analyzer (e.g., "FPIA-3000" manufactured by Sysmex Corporation).

The volume-average particle diameter of the polyurethane urea resin particles (P) and the polyurethane urea resin composition (C) is usually 20 to 500 μm, preferably 30 to 400 μm, and more preferably 50 to 300 μm. When the volume-average particle diameter of (P) and (C) is smaller than 20 μm, the powder flowability deteriorates, resulting in deteriorated moldability in slush molding or, because a dust is likely to be formed, resulting in deteriorated working conditions. When the volume-average particle diameter of (P) and (C) is greater than 500 μm, an unleveled powder remains after slush molding or many pinholes are formed in the surface of a molded article. The volume-average particle diameter is measured by the method described below.

The particle diameter distribution (Cv) of the polyurethane urea resin particles (P) and the polyurethane urea resin composition is preferably 20 to 55 and more preferably 22 to 34. When Cv is within the range of 20 to 55, the particles and the composition are suitable for slush molding applications, and a reduced number of pinholes are formed in the surface of a molded article after slush molding. Moreover, good powder flowability is attained, eliminating the necessity of a classification step. The particle diameter distribution (Cv) is measured by the method described below.

The urea groups in the polyurethane urea resin (D) can significantly enhance the performance of the polyurethane urea resin composition (C) because the urea groups significantly improve the strength, solvent resistance, and abrasion resistance of the polyurethane urea resin (D). The urea group concentration in the polyurethane urea resin (D) is preferably 0.5 to 10% by weight, more preferably 1.0 to 7.0% by weight, and most preferably 1.5 to 5.0% by weight.

When the urea group concentration is within the range of 0.5 to 10% by weight, effects of urea groups to improve strength, solvent resistance and abrasion resistance are remarkable. Additionally, when the polyurethane urea resin composition (C) is molded, the melting point and the melt viscosity thereof are restrained into low values, so that thermal energy required for the molding can be decreased.

At the same time, the urethane groups in the polyurethane urea resin (D) also improve the performance of the polyurethane urea resin (D) similarly to the urea groups. Thus, the sum total of the urethane group concentration and the urea group concentration is preferably 4 to 20% by weight, more preferably 6 to 15% by weight, and most preferably 8 to 12% by weight.

In the present invention, the urethane group concentration and the urea group concentration are the concentration (% by weight) of urethane groups and urea groups based on the weight of the polyurethane urea resin (D).

The melting point of the polyurethane urea resin (D) is preferably 160 to 260° C. and more preferably 210 to 250° C. When the melting point ranges from 160 to 260° C., the particles are excellent in blocking property in an ordinary preserving environment, and further, thermal energy at the time of molding can be decreased.

The glass transition temperature (hereinafter abbreviated to Tg) of the polyurethane urea resin (D) is preferably −65 to 0° C. and more preferably −50 to −10° C. When the Tg is from −65 to 0° C., the resin can have impact resistance even at a lower temperature.

Examples of the polyurethane urea resin (D) in the present invention include resins obtained by causing an isocyanate group-terminated urethane prepolymer (A) formed from an aliphatic diisocyanate (a1) and an active hydrogen component comprising a monool (a2), a high molecular diol (a3) having a number-average molecular weight (hereinafter abbreviated to Mn) of 500 to 10,000, and, as necessary, a low molecular diol (a4) to react with an alicyclic diamine and/or an aliphatic diamine (B).

The Mn in the present invention is measured by gel permeation chromatography by using "Waters Alliance 2695" manufactured by Waters as a measuring instrument, and using tetrahydrofuran (hereinafter abbreviated to THF) as a solvent and polystyrene as a molecular weight standard substance.

Examples of the aliphatic diisocyanate (a1) include (i) aliphatic diisocyanates having 4 to 20 carbon atoms [ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl) carbonate, 2-isocyanatoethyl-2,6-diisocyanato hexanoate, etc.]; (ii) alicyclic diisocyanates having 6 to 18 carbon atoms [isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene, etc.]; (iii) araliphatic diisocyanates having 10 to 18 carbon atoms [m- or p-xylylene diisocyanate (XDI), α,α,α',α'-tetramethylxylylene diisocyanate (TMXDI), etc.]; (iv) modified forms of these diisocyanates (modified diisocyanates having a carbodiimide group, a uretdione group, a uretimine group, a urea group, etc.); and mixtures of two or more thereof.

Of these, preferred are aliphatic diisocyanates having 4 to 20 carbon atoms and alicyclic diisocyanates having 6 to 18 carbon atoms, and particularly preferred are HDI, IPDI and hydrogenated MDI.

Examples of the above-described monool (a2) include aliphatic monools having 1 to 8 carbon atoms [linear monools (methanol, ethanol, propanol, butanol, pentanol, hexanol, octanol, etc.), and monools having a branched chain (isopropyl alcohol, neopentyl alcohol, 3-methyl-pentanol, 2-ethylhexanol), etc.]; monools having a cyclic group having 6 to 10 carbon atoms [alicyclic group-containing monools (cyclohexanol, etc.) and aromatic ring-containing monools (benzyl alcohol, etc.), etc.]; high molecular monools (polyester monool, polyether monool, polyetherester monool, etc.); and mixtures of two or more thereof.

Of these, preferred are aliphatic monools having 1 to 8 carbon atoms.

Examples of the high molecular weight diol (a3) include polyester diols, polyether diols, polyetherester diols, and mixtures of two or more thereof.

Examples of the polyester diols include (i) diols each produced by condensation polymerization of a low molecular diol, and a dicarboxylic acid or an ester-formable derivative thereof [an acid anhydride, a lower alkyl (having 1 to 4 carbon atoms) ester, an acid halide, etc.] or a dialkyl carbonate (the alkyl group has 1 to 4 carbon atoms); (ii) diols each produced by ring opening polymerization of a lactone monomer using a low molecular diol as an initiator; (iii) diols each produced by causing a dicarboxylic acid anhydride and an alkylene oxide (hereinafter abbreviated to AO) to react with each other using a low molecular diol as an initiator; and mixtures of two or more thereof.

Specific example of the low molecular diols in the above-mentioned (i), (ii), and (iii) include aliphatic diols having 2 to 8 carbon atoms [linear diols (ethylene glycol, diethylene glycol, 1,3-propanediol, 1,4-butanediol, 1,5-pentanediol, 1,6-hexanediol, etc.), diols having a branched chain (propylene glycol, neopentyl glycol, 3-methyl-1,5-pentanediol, 2,2-diethyl-1,3-propanediol, and 1,2-, 1,3-, or 2,3-butanediol, etc.), etc.]; diols having a cyclic group [alicyclic group-containing diols having 6 to 15 carbon atoms [1,4-bis(hydroxymethyl)cyclohexane, hydrogenated bisphenol A, etc.], aromatic ring-containing diols having 8 to 20 carbon atoms (m- or p-xylylene glycol, etc.) and bis(2-hydroxyethyl)terephthalate, etc.]; AO adducts thereof (having a molecular weight of less than 500); monocyclic dihydric phenols [catechol, hydroquinone, etc.], AO adducts of bisphenols (bisphenol A, bisphenol S, bisphenol F, etc.) or polynuclear phenols (dihydroxynaphthalene, etc.) (having a molecular weight of less than 500); and mixtures of two or more thereof. Of these, preferred are aliphatic diols having 2 to 8 carbon atoms and alicyclic group-containing diols having 6 to 15 carbon atoms.

Examples of the above-mentioned AO include AOs having 2 to 4 carbon atoms [ethylene oxide (hereinafter abbreviated to EO), 1,2- or 1,3-propylene oxide (hereinafter abbreviated to PO), 1,2-, 1,3-, 1,4- or 2,3-butylene oxide], styrene oxide, α-olefin oxides having 5 to 10 or more carbon atoms, epichlorohydrin, and combinations of two or more thereof (block- or random addition).

Specific examples of the dicarboxylic acid or an ester-forming derivative thereof for (i) include aliphatic dicarboxylic acids having 4 to 16 carbon atoms [succinic acid, adipic acid, sebacic acid, glutaric acid, azelaic acid, maleic acid, fumaric acid, etc.] aromatic dicarboxylic acids having 8 to 12 carbon atoms [terephthalic acid, isophthalic acid, orthophthalic acid, tert-butylisophthalic acid, 2,6-naphthalenedicarboxylic acid, 4,4'-biphenyldicarboxylic acid, etc.], ester-forming derivatives thereof [acid anhydrides (phthalic anhydride, maleic anhydride, etc.), lower alkyl esters (dimethyl ester, diethyl ester, etc.), acid halides (acid chlorides, etc.), etc.], and mixtures of two or more thereof.

Examples of the lactone monomer for (ii) include lactones having 4 to 12 carbon atoms (e.g., γ-butyrolactone, γ-valerolactone, and ε-caprolactone) and mixtures of two or more thereof.

Examples of the polyetherdiol include AO adducts of the above-described low molecular diol. Preferred as the polyetherdiol are polyoxytetramethylene glycol, AO adducts of monocyclic dihydric phenols, AO adducts of bisphenols, and AO adducts of polynuclear phenols, and more preferred are EO adducts of bisphenols.

Examples of the polyetherester diols include products each obtained by using the above-described polyether diol instead of the low molecular diol that is a raw material in the aforementioned polyester diol, for example, products each obtained by condensation polymerization of one or more of the above-described polyether diols, and one or more of the dicarboxylic acids or the ester-formable derivatives thereof disclosed as examples of the raw material of the aforementioned polyester diols.

As the high molecular diol (a3), it is preferred to use as essential components a polyester diol (a31) having a Tg of 0 to 70° C. and a high molecular diol (a32) having a solubility parameter (hereinafter abbreviated to SP value) 1.2 to 3.0 lower than the SP value of the (a31) and having a Tg of −75 to −40° C.

As the polyester diol (a31), preferred is one obtained by polycondensing an aliphatic diol having 2 to 4 carbon atoms of the aforementioned low molecular diol and an aromatic dicarboxylic acid having 8 to 12 carbon atoms.

Of aliphatic diols having 2 to 4 carbon atoms, ethylene glycol is particularly preferred.

It is preferred to use as the aromatic dicarboxylic acid having 8 to 12 carbon atoms at least one member selected from the group consisting of terephthalic acid, isophthalic acid, and orthophthalic acid, more preferred are a mixture of terephthalic acid and isophthalic acid and a mixture of terephthalic acid and orthophthalic acid, and particularly preferred is a mixture of terephthalic acid and orthophthalic acid.

When the aromatic dicarboxylic acid is a mixture of the above-mentioned two members, the molar ratio thereof is preferably from 7/3 to 3/7, and more preferably from 6/4 to 4/6.

When the Tg of the polyester diol (a31) is lower than 0° C., the heat resistance of the polyurethane urea resin (D) deteriorates, and when the Tg is higher than 70° C., the melting point of the high molecular diol (a3) becomes high and it becomes difficult to perform a urethanization reaction. The Tg of the (a31) is preferably 10 to 60° C. and more preferably 20 to 50° C.

The Tg in the present invention is measured under the following conditions using, for example, differential scanning calorimetry (DSC: e.g., "RDC220 robot DSC" manufactured by Seiko Instruments Inc.).

Measurement conditions: the amount of sample is 5 mg.
(1) The sample is heated from −100° C. to 100° C. at a heating rate of 20° C./min and is held at 100° C. for 10 minutes.
(2) The sample is cooled from 100° C. to −100° C. at a cooling rate of −90° C./min and is held at −100° C. for 10 minutes.
(3) The sample is heated from −100° C. to 100° C. at a heating rate of 20° C./min.
Analysis method: Tg is calculated from a DSC curve taken during the second heating.

The Mn of the polyester diol (a31) is preferably 800 to 5,000, more preferably 800 to 4,000, and particularly preferably 900 to 3,000.

The high molecular diol (a32) has an SP value 1.2 to 3.0 smaller, preferably 1.5 to 2.5 smaller, than the SP value of the polyester diol (a31).

It is conceivable that the use of the high molecular diol (a32) having an SP value that is far from the SP value of the polyester diol (a31) makes these substances undergo microphase separation, so that the (a31) forms a hard segment of an elastomer and the (a32) forms a soft segment of the elastomer and, as a result, the tensile strength of a resulting polyurethane urea resin (D) is improved.

When the difference between the SP value of (a31) and the SP value of (a32) is smaller than 1.2, the (a31) and the (a32) are highly compatible and therefore both the (a31) and the (a32) function as soft segments, so that high tensile strength fails to be attained. When the difference between the SP value of (a31) and the SP value of (a32) is larger than 3.0, the system will separate into two phases at the time of performing a urethanization reaction, so that it is difficult to obtain a uniform polyurethane urea resin (D).

The SP value in the present invention is calculated by the Fedors method.

The SP value can be expressed by the following formula.

$$SP\ value(\delta)=(\Delta H/V)^{1/2}$$

In the formula, $\Delta H$ represents a molar heat of vaporization (cal/mol) and V represents a molar volume (cm$^3$/mol). As to $\Delta H$ and V, the sum total ($\Delta H$) of the molar heat of vaporization and the sum total (V) of the molar volume of an atomic group described in "POLYMER ENGINEERING AND SCIENCE FEBRUARY, 1974, Vol. 14, No. 2, ROBERT F. FEDORS. (pages 151-153)" and "POLYMER ENGINEERING AND SCIENCE JUNE, 1974, Vol. 14, No. 6, ROBERT F. FEDORS. (page 472)" can be used.

As to the SP value, this is an index that means that substances being close in this value mix easily with each other (i.e., they are high in compatibility) and substances with values being far from each other are difficult to mix with each other.

The Tg of the high molecular diol (a32) is usually −75 to −40° C. If the Tg is lower than −75° C., a thermoplastic polyurethane urea resin (D) suitable for slush molding fails to be obtained, whereas if the Tg exceeds −40° C., the tensile property of the polyurethane urea resin (D) at low temperature (e.g., −35° C.) deteriorates.

Examples of the high molecular diol (a32) include ones having an SP value 1.2 to 3.0 smaller than the SP value of the polyester diol (a31) and having a Tg of −75 to −40° C. selected from among the polyester diols, polyether diols, and polyether ester diols disclosed as examples of the high molecular diol (a3). Of these, polyester diols (a321) obtained by polycondensing aliphatic diols having 2 to 10 carbon atoms of the above-mentioned low molecular diols and the above-mentioned aliphatic dicarboxylic acids having 4 to 16 carbon atoms are preferred, polyester diols prepared from ethylene glycol and aliphatic dicarboxylic acids having 6 to 15 carbon atoms and polyester diols prepared from aliphatic diols having 4 to 10 carbon atoms and aliphatic dicarboxylic acids having 4 to 16 carbon atoms are more preferred, and polyethylene adipate, polytetramethylene adipate, and polyhexamethylene adipate are particularly preferred.

The Mn of the high molecular diol (a32) is preferably 800 to 5,000, more preferably 800 to 4,000, and particularly preferably 900 to 3,000.

In using a polyester diol (a31) and a high molecular diol (a32), when the high molecular diol (a32) is a polyester diol obtained by polycondensing an aliphatic diol having 2 to 10 carbon atoms of the low molecular diols and an aliphatic dicarboxylic acid having 4 to 16 carbon atoms, it is preferred to use together a polyester diol (a33) composed of ethylene glycol, an aliphatic diol having 4 to 10 carbon atoms, at least one phthalic acid selected from the group consisting of terephthalic acid, isophthalic acid, and orthophthalic acid, and an aliphatic dicarboxylic acid having 4 to 16 carbon atoms. The use of the (a33) in combination lowers the melting point of the high molecular diol (a3), affording improved handling property.

Of the options of the (a33), preferred are polyester diols obtained by transesterifying the polyester diol (a31) and the polyester diol (a321) at 160 to 220° C.

The mixing ratio (in weight) of (a31) and (a321) [(a31)/(a321)] is preferably from 0.5 to 5.

The use amount of the (a33) is preferably 5 to 100% by weight based on the weight of the (a31), more preferably 5 to 70% by weight, and most preferably 5 to 50% by weight.

Examples of the low molecular diol (a4) to be used, as necessary, for the formation of the isocyanate group-terminated urethane prepolymer (A) include the low molecular diols disclosed as examples in the description of the polyester diol. Of the options of the (a4), preferred are aliphatic diols having 2 to 8 carbon atoms. The use amount of the (a4) is usually 20% by weight or less and preferably 10% by weight or less based on the weight of the (a3).

The additional use of an active hydrogen-containing compound represented by formula (1) as a formulation component of the isocyanate group-terminated urethane prepolymer (A) can improve mechanical properties (elongation and tensile strength) of the polyurethane urea resin (D) to be obtained.

[Chemical Formula 1]

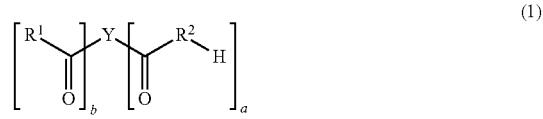

(1)

In formula (1), each $R^1$ represents a monovalent group formed by removing one active hydrogen atom from a monovalent or polyvalent active hydrogen-containing compound, or a hydroxy group; the plurality of $R^1$s each may be the same or different; $R^2$ represents a divalent group formed by removing two active hydrogen atoms from a divalent active hydrogen-containing compound, and when there are a plurality of $R^2$s, the $R^2$ s each may be the same or different; Y represents a tri- or more valent group formed by removing all carboxyl groups from a tri- or more basic aromatic polycarboxylic acid; the aromatic ring of Y is constituted from carbon atoms, wherein a substituent other than a carboxyl group and/or a halogen atom may be attached to any of the carbon atoms, and at least one of the carbon atoms has thereon no substituents attached thereto; a represents an integer of 1 or greater, b represents an integer of 0 or greater, and $3 \leq a+b \leq d-1$ is satisfied, where d represents the number of hydrogen atoms bound to the carbon atoms constituting the aromatic ring in the event that all the substituents including the carboxyl groups of the aromatic polycarboxylic acid have been substituted with hydrogen atoms, that is, the number of the sites that can be substituted on the aromatic ring.

Examples of the monovalent or polyvalent active hydrogen-containing compound include hydroxyl group-containing compounds, amino group-containing compounds, carboxyl group-containing compound, thiol group-containing compounds, and phosphoric acid compounds each having 1 to 30 carbon atoms; and compounds having two or more types of active hydrogen-containing functional groups (e.g., a hydroxy group, an amino group, a carboxyl group, a thiol group, and a phosphoric acid group) in the molecule.

The hydroxyl group-containing compounds includes monohydric alcohols, di- to octahydric polyhydric alcohols, phenols, polyhydric phenols, etc.; specific examples thereof include monohydric alcohols, such as methanol, ethanol, butanol, octanol, benzyl alcohol, and naphthylethanol; dihydric alcohols, such as ethylene glycol, propylene glycol, 1,3- and 1,4-butanediol, 1,6-hexanediol, 1,10-decanediol, diethylene glycol, neopentyl glycol, cyclohexanediol, cyclohexane dimethanol, 1,4-bis(hydroxymethyl)cyclohexane, and 1,4-bis(hydroxyethyl)benzene; trihydric alcohols, such as glycerol and trimethylolpropane; tetra to octahydric alcohols, such as pentaerythritol, sorbitol, mannitol, sorbitan, diglycerol, dipentaerythritol and the like, sucrose, glucose, mannose, fructose, methyl glucoside, and derivatives thereof; phenols, such as phenol, fluoroglucine, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil-based polyols; polyfunctional (for example, the number of functional groups is 2 to 100) polyols, such as (co)polymers of hydroxyalkyl (meth)acrylates and polyvinyl alcohol, condensates of phenol and formaldehyde (novolac), and the polyphenol disclosed in U.S. Pat. No. 3,265,641. Of these, preferred from the productivity point of view is benzyl alcohol.

(Meth)acrylate means methacrylate and/or acrylate, and the same shall apply hereinafter.

The amino group-containing compound include amines, polyamines, aminoalcohols, etc.; specific examples thereof include ammonia; monoamines, such as alkylamines having 1 to 20 carbon atoms (butylamine, etc.) and aniline; aliphatic polyamine, such as ethylenediamine, hexamethylenediamine, and diethylenetriamine; heterocyclic polyamines, such as piperazine and N-aminoethylpiperazine; alicyclic polyamines, such as dicyclohexylmethanediamine and isophoronediamine; aromatic polyamines, such as phenylenediamine, tolylenediamine, and diphenylmethanediamine; alkanolamines, such as monoethanolamine, diethanolamine, and triethanolamine; polyamidepolyamines obtained by condensation of a dicarboxylic acid with an excess of polyamine; polyetherpolyamines: hydrazines (hydrazine, monoalkylhydrazine, etc.), dihydrazides (succinic acid dihydrazide, terephthalic acid dihydrazide, etc.), guanidines (butylguanidine, 1-cyanoguanidine, etc.); and dicyandiamides, etc.

Examples of the carboxyl group-containing compounds include aliphatic monocarboxylic acids, such as acetic acid and propionic acid; aromatic monocarboxylic acids, such as benzoic acid; aliphatic dicarboxylic acids, such as succinic acid, fumaric acid, sebacic acid, and adipic acid; aromatic polycarboxylic acids, such as phthalic acid, isophthalic acid, terephthalic acid, trimellitic acid, naphthalene-1,4-dicarboxylic acids, naphthalene-2,3,6-tricarboxylic acid, pyromellitic acid, diphenic acid, 2,3-anthracenedicarboxylic acid, 2,3,6-anthracenetricarboxylic acid, and pyrenedicarboxylic acid; and carboxylic acid polymers, such as (co)polymers of acrylic acid (the number of functional groups is 2 to 100).

Examples of the thiol group-containing compounds include monovalent thiol compounds having 1 to 20 carbon atoms (alkanethiols such as ethane thiol, benzenethiol, and phenylmethanethiol), and polyvalent thiol compounds (1,2-ethanedithiol, 1,6-hexanedithiol, etc.), etc.

Examples of the phosphoric acid compound include phosphoric acid, phosphorous acid, and phosphonic acid, etc.

The monovalent or polyvalent active hydrogen-containing compound may also be a compound resulting from addition of AO to the above-described active hydrogen-containing compound.

As AO to be added, PO, EO, and 1,2-butylene oxide are preferred from the viewpoints of properties and reactivity. In the case that two or more types of AO are used (e.g., PO and EO), the additional method may be either block addition or random addition, and a combination thereof is also available.

Moreover, as the monovalent or polyvalent active hydrogen-containing compound, it is also permitted to use a polyester diol obtained by a condensation reaction of a diol and a dicarboxylic acid, for example, the polyester diols disclosed as examples of the high molecular diol (a3).

From the viewpoint of well-balancing of the low temperature melting property of the polyurethane urea resin composition (C) with the tensile strength, elongation and heat resistance of a molded article thereof, $R^1$ in formula (1) is preferably a monovalent hydrocarbon group having 1 to 29 carbon atoms and more preferably is a benzyl group.

Examples of the divalent active hydrogen-containing compound in formula (1) include the divalent active hydrogen-containing compounds of the above-described monovalent or polyvalent active hydrogen-containing compounds.

Specific examples of the divalent hydroxyl group-containing compounds include dihydric alcohols, such as ethylene glycol, propylene glycol, 1,3- and 1,4-butanediol, 1,6-hexanediol, 1,10-decanediol, diethylene glycol, neopentyl glycol, cyclohexanediol, cyclohexane dimethanol, 1,4-bis(hydroxymethyl)cyclohexane, and 1,4-bis(hydroxyethyl)benzene.

Specific examples of the divalent amino group-containing compound include aliphatic diamines, such as ethylenediamine and hexamethylenediamine; alicyclic diamines, such as dicyclohexylmethanediamine and isophoronediamine; aromatic diamines, such as phenylenediamine, tolylenediamine, and diphenylmethanediamine; etc.

Specific examples of the divalent carboxyl group-containing compounds include aliphatic dicarboxylic acids, such as succinic acid, fumaric acid, sebacic acid, and adipic acid; aromatic dicarboxylic acids, such as phthalic acid, isophthalic acid, terephthalic acid, naphthalene-1,4-dicarboxylic acid, and 2,3-anthracenedicarboxylic acid; etc.

Specific examples of the divalent thiol group-containing compounds include ethanedithiol and 1,6-hexanedithiol, etc.

From the viewpoint of improvement in mechanical properties (elongation and tensile strength) of a molded article of a polyurethane urea resin composition (C), preferred as the divalent active hydrogen-containing compound are divalent hydroxyl group-containing compounds and divalent amino group-containing compounds, more preferred are ethylene glycol, polyethylene glycol having a degree of polymerization of 2 to 5, propylene glycol, polypropylene glycol having a degree of polymerization of 2 to 5, diethylamine, and dibutylamine are more preferred, and particularly preferred is ethylene glycol.

When the divalent active hydrogen-containing compound is ethylene glycol, polyethylene glycol having a degree of polymerization of 2 to 5, propylene glycol, or polypropylene glycol having a degree of polymerization of 2 to 5, such a compound may be caused to react directly with a tri- or more basic aromatic polycarboxylic acid or EO or PO may be added to the carboxyl groups of a tri- or more basic aromatic polycarboxylic acid.

In formula (1), Y represents a residue resulting from removing all carboxyl groups from a tri- or more basic aromatic polycarboxylic acid. All the atoms constituting the aromatic ring of Y are carbon atoms, to which a substituent other than a carboxyl group and/or a halogen atom may be attached. However, at least one of the carbon atoms is required to bond not to a substituent but to a hydrogen atom.

Examples of the substituent other than a carboxyl group include an alkyl group, a vinyl group, an allyl group, a cycloalkyl group, an amino group, a hydroxyl group, a hydroxyamino group, a nitro group, a thiol group, an aryl group, and a cyano group, etc.; from the viewpoints of improvement in mechanical properties (elongation, tensile strength, and compression hardness) and cost, an alkyl group, a vinyl group, an allyl group, and an amino group are preferred.

As to the arrangement of the carbonyl group on Y originating in the carboxyl group of the tri- or more basic aromatic polycarboxylic acid, the case of the following (1) or (2) is preferred from the viewpoint of improvement in mechanical properties.
(1) In the case of a tri-basic aromatic polycarboxylic acid, a carbonyl group is attached to each of two adjacent carbon atoms that constitute the aromatic ring and one carbon atom to which no substituents are attached, namely, a carbon atom to which a hydrogen atom is attached is present between the carbon atom to which a third carbonyl group is attached and the aforementioned two carbon atoms.
(2) In the case of a tetra- or more basic aromatic polycarboxylic acid, a carbonyl group is attached to each of two adjacent carbon atoms that constitute the aromatic ring and one carbon atom to which no substituents are attached, namely, a carbon atom to which a hydrogen atom is attached is present between the carbon atom to which a third or higher carbonyl group is attached and the aforementioned two carbon atoms.

For example, in the case of a tri-basic benzene polycarboxylic acid, the substituting positions of the carboxyl groups are preferably 1, 2 and 4-positions, and in the case of a tetra-basic benzene polycarboxylic acid, the substituting positions of the carboxyl groups are preferably 1, 2, 4 and 5-positions.

Examples of the tri- or more basic aromatic polycarboxylic acid that constitutes Y include aromatic polycarboxylic acids having 8 to 18 carbon atoms such as benzene polycarboxylic acids (trimellitic acid, hemimellitic acid, trimesic acid, pyromellitic acid, etc.) and polycyclic aromatic polycarboxylic acids (naphthalene-2,3,6-tricarboxylic acid, etc.); preferred are benzene polycarboxylic acids, and more preferred are trimellitic acid and pyromellitic acid.

In formula (1), a represents an integer of 1 or greater, b represents an integer of 0 or greater, and $3 \leq a+b \leq d-1$ is satisfied, where d represents the number of hydrogen atoms bound to the carbon atoms constituting the aromatic ring in the event that all the substituents including the carboxyl groups of the aromatic polycarboxylic acid have been substituted with hydrogen atoms, that is, the number of the sites that can be substituted on the aromatic ring. For example, in the case of a benzene ring in which the aromatic ring is constituted by six carbon atoms, d is 6, a+b can be a value of 3 to 5, and in the case of a naphthalene ring in which the aromatic ring is constituted by ten carbon atoms, d is 8 and a+b can be a value of 3 to 9. In the case that the aromatic ring is a monocyclic aromatic ring, a+b is preferably 3 or 4 from the viewpoint of mechanical properties.

In formula (1), a is preferably 1 or 2 from the viewpoint of the meltability of the polyurethane urea resin composition (C).

The active hydrogen-containing compound represented by formula (1) can be obtained by making a tri- or more basic aromatic polycarboxylic acid undergo a dehydration condensation reaction with a monovalent or polyvalent active hydrogen-containing compound and a divalent active hydrogen-containing compound. The active hydrogen-containing compound represented by formula (1) can be obtained also by making an AO such as EO and PO undergo an addition reaction to a carboxyl group instead of making a divalent active hydrogen-containing compound undergo a dehydration condensation reaction.

From the viewpoint of reaction temperature, it is preferred to obtain the active hydrogen-containing compound represented by formula (1) by making a monochloride having an organic group having 1 to 30 carbon atoms undergo a dehydrochlorination reaction instead of using a monovalent or polyvalent active hydrogen-containing compound. As the monochloride, monochlorides having a chloromethylene group are more preferred, and especially benzylchloride is preferred.

From the viewpoint of well-balancing the meltability of the polyurethane urea resin composition (C) and the mechanical strength and heat resistance of a molded article of the composition, the amount to be used of the active hydrogen-containing compound represented by formula (1) is preferably 0.1 to 30% by weight, more preferably 0.5 to 20% by weight, and particularly preferably 1.0 to 10.0% by weight based on the weight of the polyurethane urea resin (D) to be formed.

In the case of using a compound in which a in formula (1) is 1, the amount to be used thereof is preferably 0.1 to 5% by weight, more preferably 0.5 to 4% by weight, and particularly preferably 1 to 3% by weight based on the weight of the polyurethane urea resin (D) to be formed from the viewpoint of the meltability of the polyurethane urea resin composition (C) and the mechanical strength and heat resistance of a molded article of the composition.

In the case of a compound in which a in formula (1) is 3 or 4, the amount to be used thereof is preferably 0.1 to 3% by weight, more preferably 0.1 to 2% by weight, and particularly preferably 0.1 to 1% by weight based on the weight of the polyurethane urea resin (D) to be formed from the viewpoint of the meltability of the polyurethane urea resin composition (C) and the mechanical strength and heat resistance of a molded article of the composition.

The reaction temperature in producing the isocyanate group-terminated urethane prepolymer (A) may be the same temperature as that usually adopted for urethanization. When a solvent is used, the temperature is usually from 20 to 100° C. When no solvent is used, the temperature is usually from 20 to 220° C., and preferably from 80 to 200° C.

When the (A) is produced, a prepolymer terminated with an isocyanate group can be obtained by using the (a1) so as to give an excessive mole of isocyanate groups for the total mole number of the terminal hydroxyl groups of the (a2), (a3) and (a4).

In the above-described prepolymerization reaction, a catalyst used ordinarily for polyurethane may, as required, be used in order to promote the reaction. Examples of the catalyst include amine-based catalysts [triethylamine, N-ethylmorpholine, triethylenediamine, etc.] and tin-based catalysts [trimethyltin laurate, dibutyltin dilaurate, dibutyltin malate, etc.], etc.

In the alicyclic diamine and/or aliphatic diamine (B) used for the reaction with the isocyanate group-terminated urethane prepolymer (A), examples of the alicyclic diamine include alicyclic diamines having 6 to 18 carbon atoms[4,4'-diamino-3,3'-dimethyldicyclohexylmethane, 4,4'-diaminodicyclohexylmethane, diaminocyclohexane, isophoronediamine, etc.]; and examples of the aliphatic diamine include aliphatic diamines having 2 to 12 carbon atoms [ethylenediamine, propylenediamine, hexamethylenediamine, etc.]; and aromatic aliphatic diamines having 8 to 15 carbon atoms [xylylenediamine,α,α,α',α'-tetramethylxylylenediamine, etc.]. These may be used alone or in a combination of two or more thereof. Of these, preferred are isophoronediamine and hexamethylenediamine.

From the viewpoint of odor, the total content of the dicondensate of acetone, the dicondensate of methyl ethyl ketone (hereinafter abbreviated to MEK) and the dicondensate of methyl isobutyl ketone (hereinafter abbreviated to MIBK) in the polyurethane urea resin (D) of the present invention is usually 1,000 ppm or less, preferably 100 ppm or less based on the weight of the (D), and it is particularly preferred that none of these dicondensates is contained.

The dicondensate of acetone is 4-methyl-3-pentene-2-one; the dicondensate of MEK is a set of 5-methyl-4-hepten-3-one and 3,4-dimethyl-3-hexen-2-one; and the dicondensate of MIBK is a set of 3-isopropyl-4,6-dimethyl-3-hepten-2-one and 2,6,8-trimethyl-5-nonen-4-one. The total content of the dicondensates means the total content of the above-described five compounds.

The total content of the dicondensates can be determined by GC/MS analysis as described in detail in the EXAMPLES section.

In the production of a diamine chain extender (a ketimine compound) blocked with the ketone used in the above-cited Patent Document 1, a dicondensate of ketone generates. Accordingly, when a ketimine compound has been used as an extender, a dicondensate of ketone is contained in polyurethane urea resin particles and serves as a causative agent of an odor.

The polyurethane urea resin (D) in the present invention is obtained by making an isocyanate group-terminated urethane prepolymer (A) react with an alicyclic diamine and/or an aliphatic diamine (B) as described in detail below.

Using the present production method, it is not necessary to use a ketimine as an extender and a diamine can be used as it is in the method of obtaining thermoplastic polyurethane urea resin particles by polymerizing an isocyanate group-terminated urethane prepolymer (A) utilizing an extension reaction in an aqueous medium. Accordingly, the content of a dicondensate of ketone in a resulting polyurethane urea resin can be controlled to 1,000 ppm or less because of no use of a ketimine extender containing a dicondensate of ketone.

The aqueous medium in the present invention means water and a mixture of water and the organic solvent (K) or (T) described below.

The powdery polyurethane urea resin composition (C) of the present invention for slush molding comprises as essential ingredients an additive (N) and a polyurethane urea resin (D) in which the total content of a dicondensate of acetone, a dicondensate of MEK, and a dicondensate of MIBK is 1,000 ppm or less. The additive (N) includes an additive (N1) that is to be added before the step of granulating the polyurethane urea resin (D) to form polyurethane urea resin particles (P) and an additive (N2) to be added after forming the polyurethane urea resin particles (P) by granulating the polyurethane urea resin (D).

Examples of the additive (N) include an inorganic filler, a pigment, a plasticizer, a releasing agent, a stabilizer, a dispersing agent, an antiblocking agent, and a strength enhancing agent, etc.; of these, the inorganic filler can be used as the additive (N1), the antiblocking agent can be used as the additive (N2), and the other additives can be used as both the additives (N1) and (N2).

The amount to be added of the additive (N), which is appropriately chosen depending upon the type of the additive, is preferably 0.01 to 50% by weight, more preferably 1 to 30% by weight relative to the weight of the polyurethane urea resin (D).

Examples of the inorganic filler include kaolin, talc, silica, titanium oxide, calcium carbonate, bentonite, mica, sericite, glass flake, glass fiber, graphite, magnesium hydroxide, aluminum hydroxide, antimony trioxide, barium sulfate, zinc borate, alumina, magnesia, wollastonite, xonotlite, whisker, and a metal powder, etc.

Of these, preferred from the viewpoint of accelerating the crystallization of a thermoplastic resin are kaolin, talc, silica, titanium oxide, and calcium carbonate, and more preferred are kaolin and talc.

The volume-average particle diameter of the inorganic filler is preferably 0.1 to 30 µm, more preferably 1 to 20 µm, and particularly preferably 5 to 10 µm from the viewpoint of dispersibility thereof in a thermoplastic resin.

The pigment is not particularly limited and known organic pigments and/or inorganic pigments may be used. The pigment is incorporated usually in an amount of 10 parts by weight or less, preferably 0.01 to 5 parts by weight per 100 parts by weight of the polyurethane urea resin composition (C).

Examples of the organic pigment include insoluble or soluble azo pigments, copper phthalocyanine-based pigments, and quinacridone-based pigments, etc.

Examples of the inorganic pigment include chromic acid salts, ferrocyanides, metal oxides (titanium oxide, iron oxide, zinc oxide, aluminum oxide, etc.), metal salts [sulfate (barium sulfate, etc.), silicates (calcium silicate, magnesium silicate, etc.), carbonates (calcium carbonate, magnesium carbonate, etc.), phosphates (calcium phosphate, magnesium phosphate, etc.), etc.], metal powders (aluminum powder, iron powder, nickel powder, copper powder, etc.), and carbon black.

The pigment is preferably pigment particles (E) having an average particle diameter of 0.05 to 5.0 µm, and the average particle diameter is more preferably 0.2 to 1 µm.

Examples of the plasticizer include phthalic esters (dibutyl phthalate, dioctyl phthalate, dibutyl phthalate benzil, diisodecyl phthalate, etc.); aliphatic dibasic acid esters (di-2-ethylhexyl adipate, 2-ethylhexyl sebacate, etc.); trimellitic acid esters (tri-2-ethylhexyl trimellitate, trioctyl trimellitate, etc.); fatty acid esters (butyl oleate, etc.); benzoic acid esters [dibenzoate of polyethylene glycol (having a degree of polymerization of 2 to 10), dibenzoate of polypropylene glycol (having a degree of polymerization of 2 to 10), etc.]; aliphatic phosphates (trimethyl phosphate, triethyl phosphate, tributyl phosphate, tri-2-ethylhexyl phosphate, tributoxy phosphate, etc.); aromatic phosphates (triphenyl phosphate, tricresyl phosphate, trixylenyl phosphate, cresyldiphenyl phosphate, xylenyldiphenyl phosphate, 2-ethylhexyldiphenyl phosphate, tris(2,6-dimethylphenyl) phosphate, etc.); halogenated aliphatic phosphates (tris (chloroethyl)phosphate, tris(β-chloropropyl)phosphate, tris (dichloropropyl) phosphate, tris(tribromoneopentyl) phosphate, etc.); and mixtures of two or more thereof.

The releasing agent may be known releasing agents including the releasing agents disclosed in JP-A-2004-67776, and examples thereof include fluorine compound type releasing agents (triperfluoroalkyl (having 8 to 20 carbon atoms) phosphates, e.g., triperfluorooctyl phosphate, and triperfluorododecyl phosphate); silicone compound type releasing agents (dimethylpolysiloxane, amino-modified dimethylpolysiloxane, carboxyl-modified dimethylpolysiloxane, etc.); aliphatic acid ester type releasing agents (monohydric or polyhydric alcohol esters of aliphatic acid having 10 to 24 carbon atoms, e.g., butyl stearate, hardened castor oil, and ethylene glycol monostearate); aliphatic acid amide type releasing agents (mono or bisamides of an aliphatic acid having 8 to 24 carbon atoms, e.g., oleic amide, palmitic amide, stearic amide, and distearic amide of ethylenediamine); metal soaps (magnesium stearate, zinc stearate, etc.); natural or synthetic waxes (paraffin wax, microcrystalline wax, polyethylene wax, polypropylene wax, etc.); and mixtures of two or more thereof.

Although the releasing agent can be used with the polyurethane urea resin particles (P) having been impregnated therewith, the moldability of projecting parts, abrasion resistance, and continuous moldability of a slush molded article obtained from the polyurethane urea resin composition (C) can be improved by using the releasing agent with the agent being adhered to the surfaces of the (P) in the form of oil-absorbed inorganic fine particles in which inorganic fine particles having a volume-average particle diameter of 0.1 to 5 µm have beforehand been impregnated with the releasing agent.

Examples of the inorganic fine particles include kaolin, talc, silica, titanium oxide, calcium carbonate, bentonite, mica, sericite, glass flake, glass fiber, graphite, magnesium hydroxide, aluminum hydroxide, antimony trioxide, barium sulfate, zinc borate, condensed aluminum phosphate, alumina, magnesia, wollastonite, xonotlite, whisker, and ametal powder, etc. Of these, silica, titanium oxide and condensed aluminum phosphate are preferred from the viewpoint of oil absorbency.

The volume-average particle diameter of the inorganic fine particles is usually 0.1 to 5 µm, preferably 0.2 to 4 µm from the viewpoint of dispersibility of the particles in a thermoplastic resin.

The amount to be used of the releasing agent is preferably 20 to 70% by weight, more preferably 30 to 60% by weight based on the weight of the oil-absorbing inorganic fine particles.

One example of the method of obtaining oil-absorbing inorganic fine particles by making inorganic fine particles absorb a releasing agent beforehand is a method of mixing the inorganic fine particles with the releasing agent by using a mixing apparatus like those described below. In a preferred embodiment of the oil-absorbing inorganic fine particles, the releasing agent has been absorbed to inside the inorganic fine particles and the particles fail to exhibit stickiness.

As the mixing apparatus to be used in producing the oil-absorbing inorganic fine particles, a known powder mixing apparatus may be used, and any of a container rotation type mixer, a fixed-container type mixer, and a fluid moving type mixer can be used. For example, examples of the fixed-container type mixers include high-speed flow type mixers, double-shaft paddle type mixers, high-speed shearing mixing apparatuses (e.g., a Henschel Mixer (registered trademark)), low-speed mixing apparatuses (e.g., a planetary mixer), and conical screw mixers (e.g., a Nauta Mixer (registered trademark)), and preferred of these are double-shaft paddle type mixers, low-speed mixing apparatuses (e.g. a planetary mixer), and conical screw mixers [e.g., a Nauta Mixer (registered trademark; this note is omitted hereinafter)].

Although the temperature and the time applied in mixing the inorganic fine particles and the releasing agent may be appropriately set depending upon the types of the inorganic fine particles and the releasing agent, the temperature is usually 20 to 100° C. and the time is usually 1 minute to 10 hours.

From the viewpoints of the moldability of projecting parts, abrasion resistance, and continuous moldability of a slush molded article, the content of the oil-absorbing inorganic fine particles is usually 0.2 to 5% by weight, preferably 0.5 to 5% by weight, and even more preferably 0.8 to 3% by weight based on the weight of the polyurethane urea resin particles (P).

By mixing polyurethane urea resin particles (P) and oil-absorbing inorganic fine particles using the above-described mixing apparatus, a polyurethane urea resin composition (C) in which the oil-absorbing inorganic fine particles have adhered to the surface of the (P) can be obtained.

The blocking inhibitor as the additive (N) is not particularly limited, and known inorganic blocking inhibitors, known organic blocking inhibitors, etc. can be used. Examples of the inorganic blocking inhibitors include silica, talc, titanium oxide, and calcium carbonate, etc. Examples of the organic blocking inhibitors include thermosetting resins (such as thermosetting polyurethane resins, guanamine-based resins, and epoxy resins) having a particle diameter of 10 µm or less, and thermoplastic resins [e.g., thermoplastic polyurethane urea resins, and poly(meth)acrylic resins] having a particle diameter of 10 µm or less.

Examples of the stabilizer include a compound having two or more radically polymerizable unsaturated groups in the molecule thereof as a stabilizer against light or heat and polycarbodiimide that improves stability against hydrolysis and heat resistance as well as ordinary ultraviolet absorbers, ordinary antioxidants, etc. used for materials for slush molding.

Examples of the compound having two or more radically polymerizable unsaturated groups in the molecule thereof include esters of (meth)acrylic acid with polyhydric alcohols (2 to 10 or more valent polyhydric alcohols; the same shall apply hereinafter) [e.g., ethylene glycol di(meth)acrylate, trimethylolpropane tri(meth)acrylate, pentaerythritol tetra(meth)acrylate, and dipentaerythritol penta(meth)acrylate]; esters of (meth)allyl alcohols with 2- to 6-basic or more basic polycarboxylic acids [e.g., diallyl phthalate and triallyl trimellitate]; poly(meth)allyl ethers of polyhydric alcohols [e.g., pentaerythritol tri(meth)allyl ether]; polyvinyl ethers of polyhydric alcohols [e.g., ethylene glycol divinyl ether]; polypropenyl ethers of polyhydric alcohols [e.g., ethylene glycol dipropenyl ether]; polyvinylbenzenes [e.g., divinylbenzene], and mixtures of two or more thereof.

Of these, preferred in radical polymerization rate are esters of (meth)acrylic acid with polyhydric alcohols, and more preferred are trimethylolpropane tri(meth)acrylate, pentaerythritol tetra(meth)acrylate, and dipentaerythritol penta(meth)acrylate.

The number of the unsaturated groups (nonconjugated double bonds) in one molecule in the compound having two or more radically polymerizable unsaturated groups in its molecule is usually 2 to 10, and preferably 3 to 6. If the number of functional groups is less than 2, color fading or increase in gloss of a molded skin will occur with time, whereas if the number of functional groups exceeds 10, the compound comes to have a high molecular weight and an increased viscosity and, as a result, becomes difficult to handle. The compound having two or more radically polymerizable unsaturated groups in its molecule captures radicals generated by a polyurethane urea resin when being degraded by light (ultraviolet rays) or heat, so that the compound having two or more radically polymerizable unsaturated groups in its molecule itself is polymerized. Accordingly, the compound works to inhibit slush molded articles from decreasing in resin strength, and color fading or increasing in gloss with time.

In the present invention, the amount to be added of the compound having two or more radically polymerizable unsaturated groups in its molecule is preferably 0.1 to 10% by weight, and more preferably 0.5 to 8 parts by weight based on the weight of the polyurethane urea resin (D). When the added amount is 0.1 parts by weight or more, decrease in resin strength caused by light or heat is reduced, whereas when the added amount is 10 parts by weight or less, molded articles are not hardened and the touch feeling is not deteriorated even if the molded articles are exposed to light or heat.

Examples of the polycarbodiimide include polycarbodiimides polymerized with organic isocyanate compounds. The use of such polycarbodiimides can improve stability against hydrolysis and heat resistance (resistance to hygrothermal aging) and prevents generation of bleeding.

Examples of the organic diisocyanate compound include the above-described aliphatic diisocyanate (a1) and aromatic polyisocyanates having 8 to 20 carbon atoms, etc.

Specific examples of the aromatic polyisocyanate having 8 to 20 carbon atoms include 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, 1,5-naphthylene diisocyanate, 4,4',4"-triphenylmethane triisocyanate, and m- or p-isocyanatophenyl sulfonyl isocyanate, etc.

Of these, preferred are aliphatic diisocyanates having 4 to 20 carbon atoms and alicyclic diisocyanates having 6 to 18 carbon atoms, and particularly preferred is α,α,α',α'-tetramethylxylylene diisocyanate.

The Mn of the polycarbodiimide is preferably 500 or more from the viewpoint of bleeding out from resin due to low molecular weight. From the viewpoint of the viscosity of the polycarbodiimide, the Mn is preferably 30,000 or less, more preferably 25,000 or less. In the case that a polycarbodiimide has an isocyanate group at its end, the Mn of the polycarbodiimide is measured by the same method as that used in the case of the above-described high molecular diol (a3) after capping the isocyanate group with dibutylamine.

Examples of the terminal group of the polycarbodiimide include an isocyanate group (the terminal group has not been capped), an alkoxy group (the terminal isocyanate group has been capped with ethylene glycol monomethyl ether, etc.), and a polyethylene glycol residue (the terminal isocyanate group has been capped with polyethylene glycol). Of these, an alkoxy group is preferred from the viewpoints of stability against hydrolysis and heat resistance.

The amount to be added of the polycarbodiimide is preferably 0.1 to 10% by weight based on the total weight of the polyurethane urea resin (D) and the polycarbodiimide. That the amount to be added of the polycarbodiimide is 0.1% by weight or more is preferred because this makes it possible to obtain a sufficient effect as a stabilizer and that the amount to be added is 10% by weight or less is preferred because this gives no adverse influence on physical properties of molded articles of the polyurethane urea resin composition (C).

Examples of the method of adding the polycarbodiimide include the following methods.

(1) When an isocyanate group-terminated urethane prepolymer (A) is synthesized, a polycarbodiimide is mixed with at least one selected from among an aliphatic diisocyanate (a1), a monool (a2), a high molecular diol (a3) and, as required, a low molecular diol (a4).

(2) Mixing a polycarbodiimide with an isocyanate group-terminated urethane prepolymer (A).

(3) Mixing with a plasticizer, a pigment, a stabilizer, etc., which are added according to need.

(4) The foregoing three methods are used in combination.

Of these, method (2) is preferred. While the polycarbodiimide may be added in the form of a solid powder or a solution, it is preferably added in the form of a solution.

Examples of the strength enhancing agent include a compound represented by formula (2). The addition of this compound can impart excellent performance with respect to all three properties, i.e., the meltability of the polyurethane urea resin composition (C), the heat resistance and the mechanical property of a molded article of the (C).

[Chemical Formula 2]

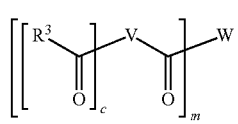

(2)

In formula (2), each $R^3$ represents a monovalent group formed by removing one active hydrogen atom from a monovalent or polyvalent active hydrogen-containing compound, or a hydroxy group; the plurality of $R^3$s each may be the same or different; V represents a tri- or more valent group formed by removing all carboxyl groups from a tri- or more basic aromatic polycarboxylic acid, wherein a hydrogen atom is bound to at least one ring-constituting carbon in the aromatic ring of V; c is an integer that satisfies $2 \leq c \leq (d-2)$, where d represents the number of hydrogen atoms bound to the carbon atoms constituting the aromatic ring in the event that all the substituents including the carboxyl groups of the aromatic polycarboxylic acid have been substituted with hydrogen atoms, that is, the number of the sites that can be substituted on the aromatic ring; W represents a group formed by removing m active hydrogen atoms from an m- or more valent active hydrogen-containing compound; m represents an integer of 2 to 10.

Examples of the monovalent or polyvalent active hydrogen-containing compound in formula (2) include compounds the same as those disclosed as examples of the monovalent or polyvalent active hydrogen-containing compound in formula (1).

From the viewpoint of improvement in the mechanical properties (elongation, tensile strength) of a polyurethane urea resin molded article, hydroxyl group-containing compounds, amino group-containing compounds, AO adducts thereof, and polyester compounds obtained by a condensation reaction of an active hydrogen-containing compound with a polycarboxylic acid are preferred as the monovalent or polyvalent active hydrogen-containing compound, and more preferred are methanol, ethanol, butanol, ethylene glycol, propylene glycol, glycerol, pentaerythritol, sorbitol, sucrose, benzyl alcohol, phenol, methylamine, dimethylamine, ethylamine, diethylamine, butylamine, dibutylamine, phenylamine, diphenylamine, EO and/or PO adducts thereof, and condensates of such an active hydrogen compound with phthalic acid and/or isophthalic acid.

Examples of V in formula (2) include ones the same as those disclosed as examples of Y in formula (1).

Examples of the m- or more valent active hydrogen-containing compound that constitutes W include m- or more valent ones of the monovalent or polyvalent active hydrogen-containing compounds in formula (1).

From the viewpoint of improvement in the mechanical properties (elongation, tensile strength) of a molded article of the polyurethane urea resin composition (C), hydroxyl group-containing compounds, amino group-containing compounds, AO adducts thereof, and condensates thereof with a polycarboxylic acid are preferably used as the m- or more valent active hydrogen-containing compound, and m is preferably 2 to 8.

The amount to be added of the compound represented by formula (2) is preferably 0.1 to 10% by weight, more preferably 0.5 to 9% by weight, based on the weight of the polyurethane urea resin (D) from the viewpoint of improvement in the tensile strength and elongation of a molded article of the polyurethane urea resin composition (C).

The difference in SP value between the compound represented by formula (2) and the polyurethane urea resin (D) is preferably 0 to 1.5, more preferably 0 to 1.4, and particularly preferably 0 to 1.3. If the difference in SP value is within the above range, the visibility of a driver fails to be interfered with by the formation of an oil slick (fogging) on a windshield or the like of a vehicle and the compound is prevented from depositing (bleeding out) on the surface of a molded article.

In the event that the additive (N2) to be added after forming polyurethane urea resin particles (P) by granulating the polyurethane urea resin (D) is in a liquid form, mixing of the polyurethane urea resin particles (P) and the additive (N2) allows the additive (N2) to penetrate into the resin particles, affording polyurethane urea resin particles (P) impregnated with the additive (N2).

Examples of the mixing apparatus to be used in adding and mixing the additive (N) to the polyurethane urea resin particles (P) include the same apparatuses as those disclosed as examples of the mixing apparatus to be used in producing the above-described oil-absorbing inorganic fine particles, and preferred one is also the same.

Examples of the method for producing the powdery polyurethane urea resin composition (C) of the present invention for slush molding include the following production methods (1) to (3).

Production methods (1) to (3) are common in that the polyurethane urea resin (D) is caused to form primary particles having a volume-average particle diameter of 0.1 to 60 μm and the primary particles are coalesced to form the thermoplastic polyurethane urea resin particles (P) having irregularities.

Production method (1) is a method in which formation of primary particles and coalescence of the primary particles are performed in parallel in an aqueous medium.

Production method (2) is a method in which formulation of primary particles is performed in an aqueous medium and then solid primary particles resulting from removal of the aqueous medium are coalesced under conditions including a specific temperature or the like.

Production method (3) is a method in which formulation of primary particles is performed in an aqueous medium and then coalescence of the primary particles is performed in a slurry state with addition of a specific organic solvent under conditions including a specific temperature.

The polyurethane urea resin fine particles (G) referred to in the following production methods (2) and (3) correspond to the above-mentioned primary particles.

These production methods have eliminated the conventional problem that a diamine as an extender must be ketiminized when a diamine extension reaction is carried out in an aqueous medium and have made possible to use a diamine directly.

[Method (1) for Producing Polyurethane Urea Resin Composition (C)]

The method (1) is a production method comprising the step of obtaining thermoplastic polyurethane urea resin particles (P) having irregularities on the surface thereof by performing a polymerization reaction, formation of primary particles having a volume-average particle diameter of 0.1 to 60 w, and granulation by coalescence of the primary particles by mixing and stirring a mixture (M) composed of an alicyclic diamine and/or an aliphatic diamine (B), an organic solvent (K) having a dielectric constant of 5 to 25, and an aqueous solution (L) containing a surfactant, or water, wherein the mixture contains the (K) in an amount of 5 to 30% by weight relative to the (L) or the water, with an isocyanate group-terminated urethane prepolymer (A), wherein the polyurethane urea resin composition (C) is obtained by adding and mixing an additive (N) in any of the step of obtaining the (P) or the step of obtaining the (A) or the raw material thereof before the step of obtaining the (P), or the step after obtaining the (P).

In this method, it can be made possible to perform the formation and the coalescence of primary particles in parallel by bringing the peripheral speed in mixing and stirring, the type and amount of the organic solvent (K) to be used into specific ranges.

As to the aqueous solution (L) containing a surfactant, or water, the aqueous solution (L) containing a surfactant is preferred from the viewpoint of being easy to obtain the polyurethane urea resin particles (P) in an arbitrary particle diameter and arbitrary particle size distribution. The same shall apply to the following production methods (2) to (3).

Specifically, polyurethane urea resin particles (P) having irregularities on their surfaces can be obtained by performing the following steps (I) to (II):

Step (I): preparing a mixture (M) of an alicyclic diamine and/or an aliphatic diamine (B), and an organic solvent (K) having a dielectric constant of 5 to 25, and an aqueous solution (L) containing a surfactant, or water, the mixture containing the (K) in an amount of 5 to 30% by weight relative to the (L) or the water.

Step (II): obtaining polyurethane urea resin particles (P) having irregularities on their surfaces by mixing and stirring the mixture (M) with an isocyanate group-terminated urethane prepolymer (A) to perform a polymerization reaction, formation of primary particles having a volume-average particle diameter of 0.1 to 60 μm, and granulation by coalescence of the primary particles.

<Step (I)>

Examples of the surfactant to be used for the aqueous solution (L) containing a surfactant include water-soluble polymers (e.g., methylcellulose, polyvinyl alcohol, polyethylene glycol, polyacrylic acid salts, polyvinyl pyrrolidone, and Na salts of a copolymer of diisobutylene and maleic acid), inorganic powders (e.g., a calcium carbonate powder, a calcium phosphate powder, a hydroxyl apatite powder, and a silica powder), and surfactants (e.g., sodium dodecylbenzenesulfonate, and sodium laurylsulfate).

The amount to be used of the surfactant is preferably 10% by weight or less, more preferably from 0.001 to 8% by weight, and even more preferably from 0.01 to 5% by weight based on the weight of the (L). When the amount is within the above-described range, no effects are produced on physical properties of the resin.

The organic solvent (K) is an organic solvent having a dielectric constant of 5 to 25. The dielectric constant is preferably from 6 to 24, and more preferably from 7 to 23. The dielectric constant ∈ can be expressed by the following equation wherein when a sample substance has been filled to between electrodes of a parallel-plate capacitor having an electric capacity $C_0$ in vacuum, the electric capacity has become C:

$$\in = C/C_0.$$

The values of the dielectric constant of main organic solvents to be used suitably for the present invention are as follows.

The dielectric constant of acetone is 21.5, the dielectric constant of MEK is 15.5, the dielectric constant of THF is 8.2, and the dielectric constant of methyl acetate is 6.7.

If the organic solvent (K) has a dielectric constant of less than 5, the (K) and the aqueous solution (L) containing a surfactant are not easily mixed with each other and, as a result, granulation by coalescence of particles fails to occur, so that particles having irregular surfaces cannot be obtained. If the dielectric constant is more than 25, the dielectric constant of the mixture (M) becomes excessively high and, as a result, granulation by coalescence of particles fails to occur, so that particles having irregular surfaces cannot be obtained.

Examples of the organic solvent (K) include ketones, alcohols, ethers, and esters, and combinations of two or more thereof, etc.; preferred is at least one selected from the group consisting of ketones having 3 to 9 carbon atoms, ethers having 4 to 8 carbon atoms, and esters having 3 to 6 carbon atoms.

Examples of the ketones having 3 to 9 carbon atoms include acetone, MEK, MIBK, and diethyl ketone, etc.

Examples of the ethers having 4 to 8 carbon atoms include THF, etc.

Examples of the esters having 3 to 6 carbon atoms include methyl acetate and ethyl acetate, etc.

Of these, preferred are acetone, MEK, THF, and methyl acetate.

The content of the (K) is from 5 to 30% by weight, preferably from 7 to 28% by weight, and more preferably from 10 to 25% by weight based on the amount of the (L) or water. If the content of the (K) is less than 5% by weight, granulation by coalescence of particles fails to occur, so that particles having irregular surfaces cannot be obtained. In the event that the content of the (K) is greater than 30% by weight, the granulation by coalescence of particles cannot be controlled, so that particles having a target volume-average particle diameter are not obtained.

The content of the alicyclic diamine and/or the aliphatic diamine (B) in the mixture (M), expressed by the equivalent of the (B), is usually 0.5 to 1.5 equivalents, preferably 0.7 to 1.2 equivalents per equivalent of the isocyanate groups of the isocyanate group-terminated urethane prepolymer (A). Outside this range, a polyurethane urea resin composition (C) having good mechanical properties cannot be obtained.

The temperature in mixing the (K) and the (L) or water is preferably 10 to 40° C. The peripheral speed is preferably 0.05 to 5.0 m/s and the mixing period is preferably 1 to 5 minutes. The mixing is performed preferably just before the step (II).

<Step (II)>

The peripheral speed in performing the polymerization reaction by mixing and stirring the mixture (M) with the isocyanate group-terminated urethane prepolymer (A) is preferably 10 to 40 m/s, more preferably 15 to 25 m/s. The mixing time is preferably 30 seconds to 5 minutes. The temperature of the isocyanate group-terminated urethane prepolymer (A) is preferably 50° C. to 80° C. and the temperature of the mixture (M) is preferably 10° C. to 40° C. If within the above ranges, the formation and the coalescence of primary particles and the scission of coalesced particles by shear force are repeated during the polymerization reaction and the proportion of coalesced particles increases as the polymerization reaction proceeds, and eventually, particles having irregularities on their surfaces and having sharp particle size distribution can be obtained.

If coalescence of resin particles is completed as a result of the advance of a curing reaction on resin particle surfaces, it is possible to complete the curing reaction of the inside of particles having irregularities on the surfaces thereof produced under conditions other than the above-described stirring conditions and the above-described temperature conditions.

The volume-average particle diameter of the primary particles is usually 0.1 to 60 µm, preferably 0.5 to 50 µm, and more preferably 1 to 40 µm.

The apparatus for the granulation is not particularly limited as far as the apparatus is an apparatus commercially available as an emulsifying machine or a dispersing machine. Examples thereof include batch type emulsifying machines such as a homogenizer (manufactured by IKA), Polytron (manufactured by Kinematica, Inc.), and T K Auto Homomixer (manufactured by PRIMIX Corporation), continuous type emulsifying machines such as Ebara Milder (manufactured by Ebara Corporation), T K Filmix, and T K Pipe Line Homomixer (manufactured by PRIMIX Corporation), a colloidal mill (manufactured by Shinko Pantec Co., Ltd.), a slasher, a trigonal wet pulverizer (manufactured by Mitsui Miike Chemical Engineering Machinery, Co., Ltd.), Capitron (manufactured by Eurotec Ltd.), and a fine flow mill (manufactured by Pacific Machinery & Engineering Co., Ltd.), high-pressure emulsifying machines such as a micro fluidizer (manufactured by MIZUHO Industrial Co., Ltd.), Nanomizer, (manufactured by Nanomizer Inc.), and APV Gaulin (manufactured by Gaulin, Inc.), membrane emulsifying machines such as a membrane emulsifying machine (manufactured by REICA Co., Ltd.), vibration emulsifying machines such as Vibro Mixer (manufactured by REICA Co., Ltd.), and ultrasonic emulsifying machines such as an ultrasonic homogenizer (manufactured by Branson Ultrasonics Corporation). Of these, preferred from the viewpoint of particle size distribution are APV Gaulin, a homogenizer, T K Auto Homomixer, Ebara Milder, T K Filmix, and a T K Pipe Line Homomixer.

The method for the solid-liquid separation may be known methods including centrifugal separation, belt press, and filter press, etc. By further drying the resultant solid by a known method, polyurethane urea resin particles (P) having irregularities on their surfaces can be obtained.

The polyurethane urea resin composition (C) can be obtained by mixing the additive (N) during an arbitrary step for obtaining the (P), namely, during the above-mentioned step of obtaining the (P) or during the step of obtaining the above-described (A) or a raw material thereof to be performed before the step of obtaining the (P), or after obtaining the (P). The method for adding and mixing the additive (N) to the polyurethane urea resin particles (P) is as described above.

[Method (2) for Producing Polyurethane Urea Resin Composition (C)]

The method (2) is a production method in which the polyurethane urea resin composition (C) is obtained by obtaining thermoplastic polyurethane urea resin particles (P) having irregularities on their surfaces by the following step 1 and step 2-1 or 2-2, and then mixing the additive (N) during an arbitrary step of obtaining the (P), namely, during any step selected from among the step 1, or the step 2-1 or 2-2, or the step of obtaining a raw material of the above-described (D) before the step 1 (during production method (2); the same shall apply hereinafter) or after obtaining the (P).

Step 1:

A step of producing polyurethane urea resin fine particles (G) containing a polyurethane urea resin (D) and having a volume-average particle diameter of 0.1 to 60 μm.

Step 2-1:

A step of heating the polyurethane urea resin fine particles (G) to a temperature of from [the thermally softening temperature of the (D)−10]° C. to [the thermally softening temperature of the (D)+10]° C. while the particles are stirred at a peripheral speed of 0.5 to 50 m/s, whereby the fine particles are coalesced to granulate; and then cooling the particles after it is verified that the volume-average particle diameter of the resultant particles has reached a prescribed volume-average particle diameter, whereby polyurethane urea resin particles (P) are obtained.

Step 2-2:

A step of heating the (G) to a temperature of from 70° C. to [the thermally softening temperature of the (D)+10]° C. in the presence of an organic solvent (T), the difference between the SP value of the (T) and that of the polyurethane urea resin (D) being 3 or less and the amount of the (T) being 5 to 30% by weight based on the weight of the (G), under stirring at a peripheral speed of 0.5 to 50 m/s, whereby the fine particles are coalesced to granulate; and then cooling the particles after it is verified that the volume-average particle diameter of the resultant particles has reached a prescribed volume-average particle diameter, whereby polyurethane urea resin particles (P) are obtained.

<Step 1>

The volume-average particle diameter of the polyurethane urea resin fine particles (G) is usually 0.1 to 60 μm, preferably 0.5 to 50 μm, and more preferably 1 to 40 μm.

The polyurethane urea resin fine particles (G) can be obtained by, for example, making an isocyanate group-terminated urethane prepolymer (A) react in a mixture of an alicyclic diamine and/or an aliphatic diamine (B) and an aqueous solution (L) containing a surfactant or water, followed by solid-liquid separation by centrifugal separation, belt press, filter press, or the like and subsequent drying by a known method.

The volume-average particle diameter of the polyurethane urea resin fine particles (G) can be controlled to 0.1 to 60 μm in accordance with the amount of a dispersion stabilizer, the rotation speed of a disperser, etc. When the volume-average particle diameter of the polyurethane urea resin fine particles (G) exceeds 60 μm, a diamine does not permeate to the center part of particles, so that an elongation reaction fails to be completed. When the volume-average particle diameter is smaller than 0.1 μm, such particles are not suitable from the viewpoints of the powder flowability in their production, powder scattering, etc.

The thermally softening temperature of the polyurethane urea resin (D), which is not particularly limited, is preferably 100 to 200° C., and more preferably 120 to 180° C. Adjusting the thermally softening temperature to within the above range can afford thermoplastic polyurethane urea resin particles excellent in heat resistance and thermal meltability.

<Step 2-1>

The temperature for granulation by coalescence is preferably a temperature of from [the thermally softening temperature of the (D)−10]° C. to [the thermally softening temperature of the (D)+10]° C., and more preferably a temperature of from [the thermally softening temperature of the (D)−5]° C. to [the thermally softening temperature of the (D)+5]° C.

The stirring in the granulation by coalescence is performed at a peripheral speed of 0.5 to 50 m/s, preferably 8 to 40 m/s. If the peripheral speed is lower than 0.5 m/s, the coalescence of the particles is far frequent than the scission caused by shearing force, so that the particles become coarser. If the peripheral speed is higher than 50 m/s, the shearing force is very strong, so that the particle diameter cannot be controlled during the granulation by coalescence. The peripheral speed is preferably 8 to 40 m/s because heat can be given evenly to resin particles.

When the peripheral speed is 8 m/s or more, the particles generate heat resulting from frictional heat based on the shearing. When this heat is used to heat the resin particles and thereby perform granulation by coalescence, deposits on the jacket can be extremely reduced than when the particles are granulated only by heating the jacket.

The apparatus to be used for performing the granulation by coalescence, which is not particularly restricted, is preferably an apparatus with sufficient stirring efficiency.

Examples thereof include high-speed shearing mixing apparatuses [e.g., a "Henschel Mixer" manufactured by Nippon Coke & Engineering Co., Ltd., and a "High Speed Mixer" manufactured by Fukae Industries Co., Ltd.], and low-speed mixing apparatuses [e.g., a planetary mixer manufactured by Asada Iron Works Co., Ltd., and "Nauta Mixer" manufactured by Hosokawa Micron Group].

The end point of the granulation by coalescence shall be the time when a prescribed volume-average particle diameter has been attained in producing polyurethane urea resin particles (P) while measuring the volume-average particle diameter thereof.

When the granulation has reached the end point, the polyurethane urea resin particles (P) are immediately cooled to 50° C. or lower so as not to advance further granulation by coalescence.

<Step 2-2>

The method for adding the organic solvent (T) is not particularly limited. Thus, the entire volume of the (T) may be charged in one time to the polyurethane urea resin fine particles (G) before the particles (G) are granulated by coalescence or the (T) may be intermittently charged. The method for the charging is preferably the dropping or spraying of the solvent while the particles are stirred. The spraying is more preferred from the viewpoint of evenness.

The difference between the SP value of the organic solvent (T) and that of the polyurethane urea resin (D) is 3 or less, and preferably 1 or less. If the difference between the SP value of the (D) and that of the (T) is more than 3, the granulation by coalescence fails to occur.

The SP value of the polyurethane urea resin (D) is preferably 8 to 12.

Examples of the organic solvent (T) whose SP value differs from that of the (D) by 3 or less include ketones, alcohols, ethers, and combinations of two or more members thereof, etc., and preferred is at least one member selected from the group consisting of ketones having 3 to 9 carbon atoms and ethers having 4 to 8 carbon atoms.

Examples of the ketones having 3 to 9 carbon atoms include acetone, MEK, MIBK, and diethyl ketone, etc. Examples of the ethers having 4 to 8 carbon atoms include THF. Of these, preferred are acetone, MEK, MIBK, and THF, etc.

The amount to be added of the organic solvent (T) is 5 to 30% by weight, and preferably 10 to 25% by weight relative to the polyurethane urea resin fine particles (G). If the amount to be added is less than 5% by weight, the coalescence strength between the particles is weak so that the granulation is not attained, whereas if the amount to be added is more than 30% by weight, the system turns pasty and coarse particles are generated during the granulation by coalescence, resulting in a broadened particle diameter distribution.

In the case of having sprayed the organic solvent (T), the granulation by coalescence can be attained at a lower temperature as compared with the case of having failed to spray it. The temperature for the granulation by coalescence is preferably a temperature of from 70° C. to [the thermally softening temperature of the (D)+10]° C., and more preferably a temperature of from 80° C. to [the thermally softening temperature of the (D)+5]° C.

The stirring in the granulation by coalescence is carried out at a peripheral speed of 0.5 to 50 m/s, preferably 5 to 40 m/s. If the peripheral speed is less than 0.5 m/s, the cohesive force between the particles is far larger than the shearing force so that the particles become coarse. If the peripheral speed is higher than 50 m/s, the shearing force is very strong, so that the particle diameter cannot be controlled during the granulation by coalescence. The apparatus for the granulation by coalescence and the end point of the granulation are the same as those of step 2-1.

The method for removing the remaining portion of the organic solvent (T) after the granulation by coalescence may be a known method (e.g., desolvation). Examples of the removing method include a method of removing the solvent by heating under reduced pressure or normal pressure under stirring. However, if the system is heated to a temperature of 70° C. or higher, the granulation by coalescence of resin particles proceeds. Thus, the removal of the solvent must be performed at a heating temperature of 70° C. or lower.

The polyurethane urea resin composition (C) can be obtained by mixing the additive (N) during an arbitrary step for obtaining the (P) or after obtaining the (P).

The method of adding and mixing the additive (N) to the polyurethane urea resin particles (P) is the same as that described above.

[Method (3) for Producing Polyurethane Urea Resin Composition (C)]

The method (3) is a production method in which a polyurethane urea resin composition (C) is obtained by obtaining thermoplastic polyurethane urea resin particles (P) having irregularities on their surfaces by steps 3 and 4 described below and mixing an additive (N) during an arbitrary step for obtaining the (P) or after obtaining the (P).

Step 3:
A step of producing polyurethane urea resin fine particles (G) containing a polyurethane urea resin (D) and having a volume-average particle diameter of 0.1 to 60 μm, and subsequently producing a slurry (R) which contains the (G) and an aqueous solution (L) containing a surfactant, or water.

Step 4:
A step of obtaining polyurethane urea resin particles (P) by causing coalescence of the polyurethane urea resin fine particles (G) by adding an organic solvent (T) having an SP value differing by 3 or less from that of the polyurethane urea resin (D) to the slurry (R) and then by stirring at a temperature of 10° C. or higher, preferably from 10° C. to [the boiling point of the organic solvent (T)]° C., at a peripheral speed of 0.1 to 10 m/s.
<Step 3>

The production of the polyurethane urea resin fine particles (G) is the same as in the above-described production method (2). When the polyurethane urea resin fine particles (G) are ones produced in an aqueous medium, the polyurethane urea resin fine particles (G) in a state of being dispersed in the aqueous medium can also be used as they are, instead of solid polyurethane urea resin fine particles (G).

The polyurethane urea resin fine particles (G) are dispersed in the aqueous solution (L) containing a surfactant, or the water to prepare a slurry. The aqueous solution (L) containing a surfactant, or the water is the same as in the above-described production method (1).

The polyurethane urea resin fine particles (G) are added to the (L) or the water preferably in a proportion of 15 to 50% by weight, and more preferably 20 to 40% by weight. When the proportion is in the above-described range, the frequency of collision between the particles is high, so that the particles can be mixed with each other evenly. Thus, particles with a target particle diameter can be obtained.

The method for preparing the slurry is preferably a method of charging the polyurethane urea resin fine particles (G) into the (L) or the water under stirring so as not to cause the (G) to aggregate with each other. The temperature for preparing the slurry is preferably from 5 to 40° C. The mixture is stirred preferably under a condition that the peripheral speed is from 0.1 to 10 m/s.
<Step 4>

After the above-mentioned step of slurrying, the above-described organic solvent (T) is added to the slurry (R). The difference between the SP value of the organic solvent (T) and that of the polyurethane urea resin (D) is usually 3 or less, and preferably 1 or less. If the difference between the SP value of the (D) and that of the (T) is more than 3, the granulation by coalescence of resin particles fails to occur.

As the organic solvent (T) to be used in the production method (3), solvents which are the same as those to be used for the above-described production method (2) can be used, and preferred examples are also the same.

The amount to be added of the organic solvent (T) is preferably 2 to 50% by weight, and more preferably 5 to 30% by weight relative to the above-described slurry (R). When the amount is from 2 to 50% by weight, the coalescing strength between the particles is strong and the particle diameter distribution is narrow.

The method for adding the organic solvent (T) is not particularly limited, and the (T) may be charged into the slurry (R) in one time or intermittently. The organic solvent (T) also may be added dropwise during the granulation by coalescence of resin particles.

By adding the organic solvent (T) to the slurry (R) and stirring, the polyurethane urea resin fine particles (G) can be coalesced and thereby the polyurethane urea resin particles (P) can be obtained.

The stirring in the granulation by coalescence is carried out at a peripheral speed of 0.1 to 10 m/s, preferably 0.5 to 5 m/s. If the peripheral speed is less than 0.1 m/s, the cohesive force between the particles is far larger than the shearing force so that the particles become coarse. If the peripheral speed is more than 10 m/s, the shearing force is very strong so that the particles do not coalesce with each other. Thus, the granulation cannot be attained.

The stirring blades are not particularly limited and are preferably blades that are good in stirring efficiency. Examples of the stirring blades include paddle blades, ribbon blades, spiral blades, and anchor-shaped blades, etc.

The lower limit of the temperature used in granulation by coalescence is usually 10° C., and preferably 50° C. If the granulation temperature is lower than 10° C., the particles are not coalesced with each other, so that the granulation cannot be attained. In the case that granulation is performed under normal pressure, the upper limit of the temperature in the granulation by coalescence is usually a temperature up to the boiling point of the organic solvent (T), and is more preferably [the boiling point of the organic solvent (T)−10]° C. In the case of performing the granulation under normal pressure, if the temperature is higher than the boiling point of the organic solvent (T), the organic solvent (T) vaporizes, so that neither a target particle size nor a target particle size distribution can be obtained. In the event that the granulation is performed under pressure, the upper limit of the temperature during the granulation can be adjusted to a temperature equal to or higher than the boiling points of the organic solvent (T) and water, but the granulation is preferably performed under normal pressure.

The end point of the granulation by coalescence shall be the time when the volume-average particle diameter of resulting polyurethane urea resin particles (P) has become a prescribed particle diameter.

The method for the solid-liquid separation and the method for the drying are the same as those described for the production method (1).

The polyurethane urea resin composition (C) can be obtained by mixing the additive (N) during an arbitrary step for obtaining the (P) or after obtaining the (P). The arbitrary step for obtaining the (P) is any step selected from among step 3 or step 4 or the step of obtaining raw materials of the above-described (D) before step 3.

The method of adding and mixing the additive (N) to the polyurethane urea resin particles (P) is the same as that described above.

Any of methods (1) to (3) for producing the polyurethane urea resin compositions (C) is characterized in that the resulting polyurethane urea resin particles (P) have a particle diameter distribution (Cv) of 20 to 55 and the particle diameter distribution is sharp over a wide particle diameter range.

The volume-average particle diameter and the particle diameter distribution (Cv) in the present invention can be measured with a laser diffraction type particle diameter distribution analyzer [e.g., "Microtrac MT3000II" manufactured by Nikkiso Co., Ltd.], etc. In a relative cumulative particle diameter distribution curve obtained in this manner, the volume-average particle diameter corresponds to the particle diameter ($d_{50}$) obtained when the cumulative quantity is 50%, and Cv is defined as represented by the following equation using the standard deviation SD and $d_{50}$:

$$Cv=SD/d_{50}$$

The polyurethane urea resin composition (C) of the present invention can exert the effect of the irregularities on surfaces most efficiently because the additive (N) contains at least the pigment particles (E) and the pigment particles can be adhered uniformly to resin particle surfaces when being colored.

That is, in the polyurethane urea resin composition (C) comprising the polyurethane urea resin particles (P) and the pigment particles (E), mixing of the (E) with the (P) can afford a powdery polyurethane urea resin composition (C) for slush molding which allow the (E) to adhere to the surface of the (P) without allowing the pigment to slip down or aggregate and is excellent in color developability, etc.

In the polyurethane urea resin composition (C), almost all of the mixed particles (E) adhere onto the surfaces of the particles (P), in particular, depressions therein, so that aggregations of the pigment particles are hardly generated. Thus, the composition (C) is characterized in that a particle (F) is contained in a number of one or less per one hundred of the polyurethane urea resin particles (P), the particle (F) being a particle that has a particle diameter of 20 to 140 µm and is an aggregate of the pigment particles (E).

The polyurethane urea resin composition (C) of the present invention preferably contains the particles (F) in a number of one or less per one hundred of the polyurethane urea resin particles (P), the particle (F) being a particle that has a particle diameter of 20 to 140 µm and is an aggregate of the pigment particles (E).

The particle (F) is one generated by slipping down of the pigment particles (E) from the surfaces of the polyurethane urea resin particles (P) and the following aggregation of the pigment particles having slipped down. When the particle (F) is contained in a number of one or less per one hundred of the polyurethane urea resin particles (P), the color of the pigment is well developed, and thus such number of the particle (F) contained per one hundred of the polyurethane urea resin particles (P) is favorable because the color of the polyurethane urea resin composition (C) itself and the color of an article obtained by melt-molding the composition (C) are vividly developed, and the use amount of the pigment is sufficient even if it is small.

In the event that the additive (N) is pigment-dispersed resin particles (SE) in which the pigment particles (E) are dispersed in a resin (S), mixing the polyurethane urea resin particles (P) and the pigment-dispersed resin particles (SE) together in a polyurethane urea resin composition (C) comprising the particles (P) and the particles (SE) can afford a powdery polyurethane urea resin composition (C) for slush molding in which the particles (SE) adhere onto the surfaces of the particles (P).

By adding, to such particles having irregular surfaces, pigment-dispersed resin particles in which a pigment is dispersed in a resin in a high concentration, the resin particles where the dispersion state is kept can be fixed into depressions in the surfaces. Thus, the particles can be colored without causing the pigment to slip down or aggregate.

Examples of the resin (S) include a vinyl resin, an epoxy resin, a polyester resin, a polyamide resin, a polyurethane resin, a polyimide resin, a silicon-based resin, a phenolic resin, a melamine resin, a urea resin, an aniline resin, an ionomer resin, and a polycarbonate resin; and alloys, blend resins, each obtained by mixing two or more of these resins together or block copolymers, or graft polymers. Of these, preferred from the viewpoint of compatibility are a polyurethane resin and alloys or blend resins each including a polyurethane resin and some other resin.

Examples of the method for dispersing the pigment particles (E) in the resin (S) include, but are not particularly limited to, methods of kneading and dispersing the pigment particles (E) using a three-roll mill, a Banbury mixer, a twin screw extruder, a kneader, or the like. The temperature at the time of the dispersing is usually from 100 to 180° C., and the dispersing period is usually from 1 minute to 1 hour. Alternatively, there is a method of dispersing the pigment particles (E) in a monomer before being polymerized and then polymerizing the monomer to have a high molecular weight, thereby obtaining a pigment-dispersed resin in which the pigment particles (E) are dispersed in the resin (S). There is a method of using a jet mill pulverizer or some other to pulverize the pigment-dispersed resin in which the particles (E) have been dispersed by these methods, thereby yielding the pigment-dispersed resin particles (SE).

Further examples include a method of dispersing a pigment in a monomer before being polymerized, emulsifying and dispersing this dispersion in water or an organic solvent in which the monomer is insoluble, and subsequently polymerizing the monomer, thereby obtaining the pigment-dispersed resin particles (SE).

The concentration of the (E) in the (SE) is preferably from 20 to 90% by weight, more preferably from 30 to 80% by weight, and most preferably from 40 to 60% by weight. The ratio of the particle diameter of the resin particles (P) to that of the pigment-dispersed resin particles (SE) is preferably from 100:0.5 to 100:50, more preferably from 100:1 to 100:10, and most preferably from 100:1.5 to 100:5.

In the method for adhering the pigment particles (E) or (SE) to the resin particles (P), it is permitted to mix an organic compound (H) having a melting point of 0° C. or lower and a boiling point of 170° C. or higher, and containing in the molecule thereof at least one ester group as the additive (N) before or simultaneously with mixing the (E) or (SE) with the (P), thereby impregnating the (P) with the organic compound (H).

By mixing resin particles (P) with a pigment dispersion liquid (HE) in which pigment particles (E) have been dispersed in an organic compound (H) having a melting point of 0° C. or lower and a boiling point of 170° C. or higher, and containing in the molecule thereof at least one ester group as the additive (N), a polyurethane urea resin composition (C) can be obtained in which the (P) is impregnated with the organic compound (H) and the pigment particles (E) are adhered to the surface of the (P). When this method is performed, the polyurethane urea resin composition (C) can be efficiently colored with good reproducibility of the color.

The organic compound (H) is good in property of stably dispersing the pigment particles (E); thus, the pigment-dispersed liquid (HE) can be stored over a long term without generating the aggregation of the pigment. Moreover, the pigment-dispersed liquid (HE) comprising the organic compound (H) and the pigment particles (E) is high in affinity with the polyurethane urea resin (P); thus, the pigment particles (E) can be adhered to the surfaces of the polyurethane urea resin particles (P) evenly in a shorter period in this case than in a case where the resin particles (P) are colored with only the pigment particles (E).

Examples of the organic compound (H) include the same as those given as the examples of the aforementioned plasticizer. Of these, preferred are benzoic acid esters, and particularly preferred are dibenzoic acid esters of polyethylene glycol.

The powdery polyurethane urea resin composition (C) of the present invention for slush molding may yield a resin molded article by being subjected to slush molding. For the slush molding, there can be used a method of vibrating and rotating a box containing the polyurethane urea resin composition (C) of the present invention together with a heated mold to melt and fluidize the polyurethane urea resin composition (C) inside the mold, and then cooling and solidifying the composition to produce a molded article (e.g., a skin). The temperature (° C.) of the mold is preferably from 200 to 280° C.

The polyurethane urea resin composition (C) of the present invention is low odor and the resin molded article obtained by slush molding of the composition is suitable for automotive interior materials (e.g., an instrument panel, and a door trim). For example, a resin molded article (a skin) formed from the polyurethane urea resin composition (C) of the present invention preferably has a thickness of 0.3 to 1.2 mm. The molded article (skin) can be rendered a resin molded product by setting the article to a foaming mold to bring the front surface of the article into contact with the mold, and then causing a urethane foam to flow thereinto, thereby forming a foamed layer having a thickness of 5 to 15 mm onto the rear surface.

In the case of smooth surfaces having no irregularities, a particle (F), which is an aggregate of the pigment particles (E), is remarkably generated. However, the polyurethane urea resin particles (P) constituting the polyurethane urea resin composition (C) of the present invention have irregularities on the surfaces thereof; thus, it does not occur that the pigment particles adhering onto the resin particle surfaces are slipped down from the surfaces or the pigment particles are aggregated with each other on the particle surfaces by shear generated at the time of stirring and mixing in the coloring step, or a step subsequent thereto. As a result, the polyurethane urea resin composition (C) is good in color-developability. Furthermore, there are not caused a problem that the particles (F), which are aggregates of the pigment, are intermingled in a product, or other problems.

Moreover, when the process of the present invention is compared with a process in which a pigment is mixed with a liquid raw material of particles, which is at a stage before the raw material is made into the particles, the present invention does not require any step of washing facilities for the production carefully every time the product color is changed. Thus, the present invention can make an improvement in production performance.

EXAMPLES

Hereinafter, the present invention will be more specifically described by way of examples, to which, however, the present invention is not limited.

In the following description, "part (s)" and "%" represent "part(s) by weight" and "% by weight", respectively.

Production Example 1

Production of Urethane Prepolymer Solution (A-1)

A reaction vessel equipped with a thermometer, a stirrer, and a nitrogen inlet tube was charged with 282.9 parts of polyethylene isophthalate diol having an Mn of 2,300, 424.4 parts of polybutylene adipate diol having an Mn of 1,000, and 9.34 parts of benzyl alcohol. After purging with nitrogen, the mixture was heated to 110° C. under stirring to melt and then cooled down to 50° C. Subsequently, 150.0 parts of MEK and 132.0 parts of hexamethylene diisocyanate were charged, and then the mixture was caused to react at 90° C. for 6 hours. Subsequently, after cooling down to 70° C., 1.4 parts of a stabilizer ["IRGANOX 1010" produced by Ciba Specialty Chemicals] was added and mixed uniformly, affording a urethane prepolymer solution (A-1). The NCO content of the resultant urethane prepolymer solution was 1.63%.

Production Example 2

Production of Urethane Prepolymer Solution (A-2)

A reaction vessel equipped with a thermometer, a stirrer, and a nitrogen inlet tube was charged with 280.2 parts of polyethylene isophthalate diol having an Mn of 2,300, 420.3 parts of polybutylene adipate diol having an Mn of 1,000, and 9.25 parts of benzyl alcohol. After purging with nitrogen, the mixture was heated to 110° C. under stirring to melt and then cooled down to 50° C. Subsequently, 150.0 parts of MEK and 138.9 parts of hexamethylene diisocyanate were charged, and then the mixture was caused to react at 90° C. for 6 hours. Subsequently, after cooling down to 70° C., 1.4 parts of a stabilizer ["IRGANOX 1010" produced by Ciba Specialty Chemicals] was added and mixed uniformly, affording a urethane prepolymer solution (A-2). The NCO content of the resultant urethane prepolymer solution was 2.03%.

Production Example 3

Production of Urethane Prepolymer Solution (A-3)

A reaction vessel equipped with a thermometer, a stirrer, and a nitrogen inlet tube was charged with 1214 parts of polybutylene adipate having an Mn of 1000, 304 parts of polyethylene phthalate having an Mn of 2500 [terephthalic acid/isophthalic acid=50/50 (weight ratio)], 27.6 parts of 1-octanol, and 18.6 parts of kaolin having a volume-average particle diameter of 9.2 μm. After purging with nitrogen, the mixture was heated to 110° C. under stirring to melt and then cooled down to 60° C. Subsequently, 313.2 parts of hexamethylene diisocyanate was charged and then the mixture was caused to react at 85° C. for 6 hours. Subsequently, after cooling down to 60° C., 425 parts of THF, 2.7 parts of a stabilizer ["IRGANOX 1010" produced by Ciba Specialty Chemicals] and 1.91 parts of an ultraviolet absorber ["TINUVIN 571" produced by Ciba Specialty Chemicals] were added and mixed uniformly, affording a urethane prepolymer solution (A-3). The NCO content of the resultant urethane prepolymer solution (A-3) was 0.80%.

Example 1

Production of Polyurethane Urea Resin Particle (P-1)

To a reaction vessel were added 157.9 parts of an aqueous solution in which 5.9 parts of a dispersing agent ["SANSPEARL PS-8" produced by Sanyo Chemical Industries, Ltd.] had been dissolved in 152 parts of water and 37.1 parts of MEK (dielectric constant=15.5), followed by uniformly mixing at 20° C. Subsequently, 1.7 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 103.3 parts of the urethane prepolymer solution (A-1) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-1).

[Production of Polyurethane Urea Resin Composition (C-1)]

To a Henschel mixer were charged 100 parts of the polyurethane urea resin particles (P-1) prepared above and 10.6 parts of a pigment dispersion liquid prepared by dispersing 2.6 parts of carbon black as a colorant in 8.0 parts of a dibenzoic acid ester of polyethylene glycol (polymerization degree: 2 to 10) ["SANSOFT EB300" produced by Sanyo Chemical Industries, Ltd., melting point: 0° C. or lower, boiling point: 300° C. or higher], followed by stirring at a revolution speed of 700 $min^{-1}$ for 1 minute. Subsequently, the mixture was transferred to a Nauter mixer and then 0.3 parts of an ultraviolet absorber [TINUVIN 765; produced by Ciba Specialty Chemicals] was charged and stirred at 70° C. for 4 hours, so that the (P-1) was impregnated with SANSOFT EB300 and TINUVIN 765. Subsequently, 0.06 parts of dimethylpolysiloxane [KEI L45-10000; produced by Nippon Unicar Co., Ltd.] as an internal releasing agent was charged and mixed for 1 hour and then cooled to room temperature. Finally, 0.5 parts of a blocking inhibitor [Ganz Pearl PM-030S, produced by Ganz Chemical Co., Ltd.] was charged and mixed, and the resultant mixture was passed through a sieve having a mesh of 48 and then a fraction passed through a sieve having a mesh of 200 was removed, affording powdery polyurethane urea resin composition (C-1) for slush molding.

Example 2

Production of Polyurethane Urea Resin Particle (P-2)

To a reaction vessel were added 184.8 parts of an aqueous solution in which 12 parts of a dispersing agent ["SANSPEARL PS-8" produced by Sanyo Chemical Industries, Ltd.] had been dissolved in 172.8 parts of water and 55.2 parts of MEK (dielectric constant=15.5), followed by uniformly stirring at 20° C. Subsequently, 1.2 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 59 parts of the urethane prepolymer solution (A-1) whose temperature had been adjusted to 75° C. was charged and mixed under continuous stirring, followed by mixing at a peripheral speed of 30 m/s for 3 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-2).

[Production of Polyurethane Urea Resin Composition (C-2)]

Powdery polyurethane urea resin composition (C-2) for slush molding was obtained in the same way as in [Production of polyurethane urea resin composition (C-1)] in Example 1 except that the polyurethane urea resin particles (P-1) were replaced by polyurethane urea resin particles (P-2).

Example 3

Production of Polyurethane Urea Resin Particle (P-3)

To a reaction vessel were added 151 parts of an aqueous solution in which 1.6 parts of a dispersing agent ["SAN- SPEARL PS-8" produced by Sanyo Chemical Industries, Ltd.] had been dissolved in 149.4 parts of water and 8 parts of methyl acetate (dielectric constant=6.7), followed by uniformly stirring at 20° C. Subsequently, 3.4 parts of isophoronediamine was added under stirring using ULTRA-DISPERSER manufactured by Yamato Scientific Co., Ltd. at a peripheral speed of 23 m/s (revolution speed: 10,000 rpm) and mixed for 1 minute. Subsequently, 137.6 parts of the urethane prepolymer solution (A-2) whose temperature had been adjusted to 75° C. was charged and mixed under continuous stirring, followed by mixing at a peripheral speed of 10 m/s for 1 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-3).

[Production of Polyurethane Urea Resin Composition (C-3)]

Powdery polyurethane urea resin composition (C-3) for slush molding was obtained in the same way as in [Production of polyurethane urea resin composition (C-1)] in Example 1 except that the polyurethane urea resin particles (P-1) were replaced by polyurethane urea resin particles (P-3).

Example 4

Production of Polyurethane Urea Resin Particle (P-4)

To a reaction vessel were added 194.4 parts of an aqueous solution in which 27 parts of a dispersing agent ["SAN-SPEARL PS-8" produced by Sanyo Chemical Industries, Ltd.] had been dissolved in 167.4 parts of water and 75.6 parts of acetone (dielectric constant=21.5), followed by uniformly stirring at 20° C. Subsequently, 0.5 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 29.5 parts of the urethane prepolymer solution (A-1) whose temperature had been adjusted to 75° C. was charged and mixed under continuous stirring, followed by mixing at a peripheral speed of 40 m/s for 5 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-4).

[Production of Polyurethane Urea Resin Composition (C-4)]

Powdery polyurethane urea resin composition (C-4) for slush molding was obtained in the same way as in [Production of polyurethane urea resin composition (C-1)] in Example 1 except that the polyurethane urea resin particles (P-1) were replaced by polyurethane urea resin particles (P-4).

Example 5

Production of Polyurethane Urea Resin Particle (P-5)

To a reaction vessel were added 175.6 parts of an aqueous solution in which 5.9 parts of a dispersing agent ["SAN-SPEARL PS-8" produced by Sanyo Chemical Industries, Ltd.] had been dissolved in 169.7 parts of water and 19.4 parts of THF (dielectric constant=8.2), followed by uniformly stirring at 20° C. Subsequently, 1.4 parts of ethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 104.1 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-5).

[Production of Polyurethane Urea Resin Composition (C-5)]

Powdery polyurethane urea resin composition (C-5) for slush molding was obtained in the same way as in [Production of polyurethane urea resin composition (C-1)] in Example 1 except that the polyurethane urea resin particles (P-1) were replaced by polyurethane urea resin particles (P-5).

Example 6

Production of Polyurethane Urea Resin Particle (P-6)

To a reaction vessel were added 202.6 parts of an aqueous solution in which 11.3 parts of a dispersing agent ["SAN-SPEARL PS-8" produced by Sanyo Chemical Industries, Ltd.] had been dissolved in 191.3 parts of water and 22.4 parts of THF, followed by uniformly stirring at 20° C. Subsequently, 0.9 parts of isophoronediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 73.2 parts of the urethane prepolymer solution (A-2) whose temperature had been adjusted to 75° C. was charged and mixed under continuous stirring, followed by mixing at a peripheral speed of 30 m/s for 3 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-6).

[Production of Polyurethane Urea Resin Composition (C-6)]

Powdery polyurethane urea resin composition (C-6) for slush molding was obtained in the same way as in [Production of polyurethane urea resin composition (C-1)] in Example 1 except that the polyurethane urea resin particles (P-1) were replaced by polyurethane urea resin particles (P-6).

Example 7

Production of Polyurethane Urea Resin Fine Particle (G-7)

To a reaction vessel was charged 195 parts of an aqueous solution in which 5.8 parts of a dispersing agent ["SAN-SPEARL PS-8" produced by Sanyo Chemical Industries, Ltd.] had been dissolved in 189.2 parts of water. Subsequently, 2.2 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 102.8 parts of the urethane prepolymer solution (A-1) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-7). The (G-7) had a volume-average particle diameter of 18 µm, an SP value of 11.2, and a thermally softening temperature of 131° C.

[Production of Polyurethane Urea Resin Particle (P-7)]

One hundred parts of the (G-7) prepared as described above was heated to 136° C. under stirring at a peripheral speed of 35 m/s with a Henschel mixer manufactured by Nippon Coke & Engineering Co., Ltd., and then immediately cooled down to 55° C. under stirring at a peripheral speed of 2.0 m/s. Since the volume-average particle diameter was measured to be 145 µm, the particles were further cooled down to 30° C., affording polyurethane urea resin particles (P-7).

[Production of Polyurethane Urea Resin Composition (C-7)]

Powdery polyurethane urea resin composition (C-7) for slush molding was obtained in the same way as in [Production of polyurethane urea resin composition (C-1)] in Example 1 except that the polyurethane urea resin particles (P-1) were replaced by polyurethane urea resin particles (P-7).

Example 8

Production of Polyurethane Urea Resin Fine Particle (G-8)

To a reaction vessel was charged 240 parts of an aqueous solution in which 12 parts of a dispersing agent ["SAN-SPEARL PS-8" produced by Sanyo Chemical Industries, Ltd.] had been dissolved in 228 parts of water. Subsequently, 1.5 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 58.5 parts of the urethane prepolymer solution (A-1) whose temperature had been adjusted to 75° C. was charged and mixed under continuous stirring, followed by mixing at a peripheral speed of 30 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-8). The (G-8) had a volume-average particle diameter of 5 µm, an SP value of 11.2, and a thermally softening temperature of 127° C.

[Production of Polyurethane Urea Resin Particle (P-8)]

One hundred parts of the (G-8) prepared as described above was heated to 135° C. under stirring at a peripheral speed of 48 m/s with a Henschel mixer manufactured by Nippon Coke & Engineering Co., Ltd., and then immediately cooled down to 55° C. under stirring at a peripheral speed of 2.0 m/s. Since the volume-average particle diameter was measured to be 110 µm, the particles were further cooled down to 30° C., affording polyurethane urea resin particles (P-8).

[Production of Polyurethane Urea Resin Composition (C-8)]

Powdery polyurethane urea resin composition (C-8) for slush molding was obtained in the same way as in [Production of polyurethane urea resin composition (C-1)] in Example 1 except that the polyurethane urea resin particles (P-1) were replaced by polyurethane urea resin particles (P-8).

Example 9

Production of Polyurethane Urea Resin Fine Particle (G-9)

To a reaction vessel was charged 195 parts of an aqueous solution in which 5.8 parts of a dispersing agent ["SAN-SPEARL PS-8" produced by Sanyo Chemical Industries, Ltd.] had been dissolved in 189.2 parts of water. Subsequently, 2.8 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 102.2 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-9). The (G-9) had a volume-average particle diameter of 18 µm, an SP value of 10.3, and a thermally softening temperature of 134° C.

[Production of Polyurethane Urea Resin Particle (P-9)]

To 100 parts of the (G-9) prepared as described above was added dropwise 15 parts of MIBK [boiling point: 118° C.; difference between the SP value thereof and that of the polyurethane urea resin fine particles (G-9): 1.6] under stirring, and uniformly mixed. Thereafter, the mixture was heated to 85° C. under stirring at a peripheral speed of 30 m/s with a planetary mixer manufactured by Asada Iron Works Co., Ltd. and then immediately cooled down to 55° C. under stirring at a peripheral speed of 2.0 m/s. Since the volume-average particle diameter was measured to be 198 µm, the particles were further cooled down to 30° C., affording polyurethane urea resin particles (P-9).

[Production of Polyurethane Urea Resin Composition (C-9)]

Powdery polyurethane urea resin composition (C-9) for slush molding was obtained in the same way as in [Production of polyurethane urea resin composition (C-1)] in Example 1 except that the polyurethane urea resin particles (P-1) were replaced by polyurethane urea resin particles (P-9).

Example 10

Production of Polyurethane Urea Resin Fine Particle (G-10)

To a reaction vessel was charged 270 parts of an aqueous solution in which 27 parts of a dispersing agent ["SAN-SPEARL PS-8" produced by Sanyo Chemical Industries, Ltd.] had been dissolved in 243 parts of water. Subsequently, 0.5 parts of ethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 29.5 parts of the urethane prepolymer solution (A-1) whose temperature had been adjusted to 75° C. was charged and mixed under continuous stirring, followed by mixing at a peripheral speed of 40 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-10). The (G-10) had a volume-average particle diameter of 0.2 μm, an SP value of 11.2, and a thermally softening temperature of 125° C.

[Production of Polyurethane Urea Resin Particle (P-10)]

To 100 parts of the (G-10) prepared as described above was sprayed 5 parts of MEK [boiling point: 78° C.; difference between the SP value thereof and that of the polyurethane urea resin fine particles (G-10): 2.2] under stirring, and uniformly mixed. Thereafter, the mixture was heated to 76° C. under stirring at a peripheral speed of 10 m/s with a high-speed mixer manufactured by Fukae Industries Co., Ltd. and then immediately cooled down to 55° C. under stirring at a peripheral speed of 2.0 m/s. Since the volume-average particle diameter was measured to be 23 the particles were further cooled down to 30° C., affording polyurethane urea resin particles (P-10).

[Production of Polyurethane Urea Resin Composition (C-10)]

Powdery polyurethane urea resin composition (C-10) for slush molding was obtained in the same way as in [Production of polyurethane urea resin composition (C-1)] in Example 1 except that the polyurethane urea resin particles (P-1) were replaced by polyurethane urea resin particles (P-10).

Example 11

Production of Polyurethane Urea Resin Fine Particle (G-11)

To a reaction vessel was charged 156 parts of an aqueous solution in which 0.8 parts of a dispersing agent ["SAN-SPEARL PS-8" produced by Sanyo Chemical Industries, Ltd.] had been dissolved in 155.2 parts of water. Subsequently, 2.8 parts of isophoronediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 138.5 parts of the urethane prepolymer solution (A-2) whose temperature had been adjusted to 75° C. was charged and mixed under continuous stirring, followed by mixing at a peripheral speed of 10 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-11). The (G-11) had a volume-average particle diameter of 58 μm, an SP value of 10.3, and a thermally softening temperature of 145° C.

[Production of Polyurethane Urea Resin Particle (P-11)]

To 100 parts of the (G-11) prepared as described above was dropped 30 parts of acetone [boiling point: 56° C.; difference between the SP value thereof and that of the polyurethane urea resin fine particles (G-11): 1.1] under stirring, and uniformly mixed. Thereafter, the mixture was heated to 102° C. under stirring at a peripheral speed of 0.5 m/s with a high-speed mixer manufactured by Fukae Industries Co., Ltd. and then immediately cooled down to 55° C. under stirring at a peripheral speed of 2.0 m/s. Since the volume-average particle diameter was measured to be 498 μm, the particles were further cooled down to 30° C., affording polyurethane urea resin particles (P-11).

[Production of Polyurethane Urea Resin Composition (C-11)]

Powdery polyurethane urea resin composition (C-11) for slush molding was obtained in the same way as in [Production of polyurethane urea resin composition (C-1)] in Example 1 except that the polyurethane urea resin particles (P-1) were replaced by polyurethane urea resin particles (P-11).

Example 12

Production of Polyurethane Urea Resin Fine Particle (G-12)

To a reaction vessel was charged 195 parts of an aqueous solution in which 9.8 parts of a dispersing agent ["SAN-SPEARL PS-8" produced by Sanyo Chemical Industries, Ltd.] had been dissolved in 185.2 parts of water. Subsequently, 1.5 parts of ethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 103.5 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin fine particles (G-12). The (G-12) had a volume-average particle diameter of 10 μm, an SP value of 10.3, and a thermally softening temperature of 130° C.

[Production of Polyurethane Urea Resin Particle (P-12)]

To 100 parts of the (G-12) prepared as described above was sprayed 10 parts of THF [boiling point: 66° C.; difference between the SP value thereof and that of the polyurethane urea resin fine particles (G-12): 2.0] under stirring, and uniformly mixed. Thereafter, the mixture was heated to 70° C. under stirring at a peripheral speed of 20 m/s with a high-speed mixer manufactured by Fukae Industries Co., Ltd. and then immediately cooled down to 55° C. under stirring at a peripheral speed of 2.0 m/s. Since the volume-average particle diameter was measured to be 182 μm, the particles were further cooled down to 30° C., affording polyurethane urea resin particles (P-12).

[Production of Polyurethane Urea Resin Composition (C-12)]

Powdery polyurethane urea resin composition (C-12) for slush molding was obtained in the same way as in [Production of polyurethane urea resin composition (C-1)] in Example 1 except that the polyurethane urea resin particles (P-1) were replaced by polyurethane urea resin particles (P-12).

Example 13

Production of Polyurethane Urea Resin Fine Particle (G-13)

Into a reaction vessel were charged 100 parts of the urethane prepolymer solution (A-3) obtained in Production Example 3 and 1.1 parts of hexamethylenediamine, and thereto was added 500 parts of an aqueous solution in which 10.0 parts of a dispersing agent ["SANSPEARL PS-8" produced by Sanyo Chemical Industries, Ltd.] had been dissolved in 490 parts of water, followed by stirring at a peripheral speed of 20 m/s for 1 minute using ULTRADISPERSER. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the system was heated to 60° C. under reduced pressure to remove the solvent. After the removal of the solvent, the resultant was separated by filtration and then dried, affording polyurethane urea resin fine particles (G-13). The (G-13) had a volume-average particle diameter of 7 an SP value of 11.2, and a thermally softening temperature of 137° C.

[Production of Polyurethane Urea Resin Particle (P-13)]

To 100 parts of the (G-13) prepared as described above was added dropwise 5 parts of MEK [boiling point: 78° C.; difference between the SP value thereof and that of the polyurethane urea resin fine particles (G-13): 2.2] as an organic solvent (T) under stirring, and uniformly mixed. Thereafter, the mixture was heated to 81° C. under stirring at a peripheral speed of 6.5 m/s with a high-speed mixer manufactured by Fukae Industries Co., Ltd. and then immediately cooled down to 50° C. under stirring at a peripheral speed of 1.0 m/s. Since the measurement of volume-average particle diameter revealed that the volume-average particle diameter was 50 μm, 5 parts of MEK was further sprayed, the temperature was raised to 81° C., and stirring was continued for 15 minutes, and then the resultant was immediately cooled down to 50° C. under stirring at a peripheral speed of 1.0 m/s. Since the measurement of volume-average particle diameter revealed that the volume-average particle diameter was 103 μm, the temperature was raised to 55° C., and the solvent was distilled off under reduced pressure, so that polyurethane urea resin particles (P-13) were obtained.

[Production of Polyurethane Urea Resin Composition (C-13)]

Powdery polyurethane urea resin composition (C-13) for slush molding was obtained in the same way as in [Production of polyurethane urea resin composition (C-1)] in Example 1 except that the polyurethane urea resin particles (P-1) were replaced by polyurethane urea resin particles (P-13).

Example 14

Production of Polyurethane Urea Resin Particle (P-14)

Under stirring with a Henschel mixer manufactured by Nippon Coke & Engineering. Co., Ltd. at a peripheral speed of 30 m/s, 100 parts of the polyurethane urea resin fine particles (G-7) prepared in Example 7 and 0.08 parts of a copolymer of methyl methacrylate with ethylene glycol dimethacrylate in the form of a fine particle powder ["Staphyloid PM-030S", produced by Ganz Chemical Co., Ltd.] were heated to 135° C. and then immediately cooled down to 30° C. under stirring at a peripheral speed of 2.0 m/s, so that polyurethane urea resin particles (P-14) were obtained.

[Production of Polyurethane Urea Resin Composition (C-14)]

Powdery polyurethane urea resin composition (C-14) for slush molding was obtained in the same way as in [Production of polyurethane urea resin composition (C-1)] in Example 1 except that the polyurethane urea resin particles (P-1) were replaced by polyurethane urea resin particles (P-14).

Example 15

Production of Polyurethane Urea Resin Particle (P-15)

Under stirring with a Henschel mixer manufactured by Nippon Coke & Engineering. Co., Ltd. at a peripheral speed of 35 m/s, 100 parts of the polyurethane urea resin fine particles (G-7) prepared in Example 7 and 4 parts of silica in the form of a fine particle powder ["Sybloc S200", produced by Grace Japan Kabushiki Kaisha] were heated to 135° C. and then immediately cooled down to 30° C. under stirring at a peripheral speed of 2.0 m/s, so that polyurethane urea resin particles (P-15) were obtained.

[Production of Polyurethane Urea Resin Composition (C-15)]

Powdery polyurethane urea resin composition (C-15) for slush molding was obtained in the same way as in [Production of polyurethane urea resin composition (C-1)] in Example 1 except that the polyurethane urea resin particles (P-1) were replaced by polyurethane urea resin particles (P-15).

Example 16

Production of Polyurethane Urea Resin Fine Particle (G-16)

Into a reaction vessel were charged 100 parts of the prepolymer solution (A-3) obtained in Production Example 3 and 1.1 parts of hexamethylenediamine, and thereto was added 340 parts of an aqueous solution in which 6.80 parts of a dispersing agent ["SANSPEARL PS-8" produced by Sanyo Chemical Industries, Ltd.] had been dissolved in 333.2 parts of water, followed by stirring at a peripheral speed of 15 m/s for 1 minute using ULTRADISPERSER. The resultant mixture was transferred to a reaction vessel equipped with a thermometer, a stirrer and a nitrogen inlet tube, and after purging with nitrogen, the mixture was caused to react at 50° C. for 10 hours under stirring, so that a slurry containing polyurethane urea resin fine particles (G-16) was prepared. The (G-16) had a volume-average particle diameter of 22 μm, an SP value of 11.2, and a thermally softening temperature of 141° C.

[Production of Polyurethane Urea Resin Particle (P-16)]

To 180 parts of the (G-16) prepared as described above was added 20 parts of MEK [boiling point: 78° C.; difference between the SP value thereof and that of the polyurethane urea resin fine particles (G-16): 2.2] as an organic solvent (T), and the temperature was raised to 70° C. under a peripheral speed of 0.5 m/s and stirring was continued for 1 hour. Thereafter, the solvent was distilled off under reduced pressure, followed by separation by filtration, washing, and drying, so that polyurethane urea resin particles (P-16) were obtained.
[Production of Polyurethane Urea Resin Composition (C-16)]

Powdery polyurethane urea resin composition (C-16) for slush molding was obtained in the same way as in [Production of polyurethane urea resin composition (C-1)] in Example 1 except that the polyurethane urea resin particles (P-1) were replaced by polyurethane urea resin particles (P-16).

Example 17

Production of Polyurethane Urea Resin Fine Particle (G-17)

Into a reaction vessel were charged 100 parts of the prepolymer solution (A-1) obtained in Production Example 1 and 2.6 parts of hexamethylenediamine, and thereto was added 340 parts of an aqueous solution in which 6.8 parts of a dispersing agent ["SANSPEARL PS-8" produced by Sanyo Chemical Industries, Ltd.] had been dissolved in 333.2 parts of water, followed by mixing at a peripheral speed of 30 m/s for 2 minutes using ULTRADISPERSER. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the system was heated to 60° C. under reduced pressure to remove the solvent. After the removal of the solvent, the resultant was separated by filtration and then dried, affording polyurethane urea resin fine particles (G-17). The (G-17) had a volume-average particle diameter of 5 μm, an SP value of 11.2, and a thermally softening temperature of 127° C.
[Production of Polyurethane Urea Resin Particle (P-17)]

To 140 parts of an aqueous solution in which 2.80 parts of a dispersing agent ["SANSPEARL PS-8" produced by Sanyo Chemical Industries, Ltd.] had been dissolved in 137.2 parts of water was dispersed under stirring 94.2 parts of the (G-17) prepared as described above, so that a slurry was prepared. To this slurry was added 35 parts of MEK [boiling point: 78° C.; difference between the SP value thereof and that of the polyurethane urea resin fine particles (G-17): 2.2] as an organic solvent (T), and the temperature was raised to 65° C. under stirring at a peripheral speed of 3.0 m/s and stirring was continued for 3 hours. Thereafter, the solvent was distilled off under reduced pressure, followed by separation by filtration, washing, and drying, so that polyurethane urea resin particles (P-17) were obtained.
[Production of Polyurethane Urea Resin Composition (C-17)]

Powdery polyurethane urea resin composition (C-17) for slush molding was obtained in the same way as in [Production of polyurethane urea resin composition (C-1)] in Example 1 except that the polyurethane urea resin particles (P-1) were replaced by polyurethane urea resin particles (P-17).

Example 18

Production of Polyurethane Urea Resin Fine Particle (G-18)

Into a reaction vessel were charged 100 parts of the urethane prepolymer solution (A-1) obtained in Production Example 1 and 2.6 parts of hexamethylenediamine, and thereto was added 340 parts of an aqueous solution in which 6.80 parts of a dispersing agent ["SANSPEARL PS-8" produced by Sanyo Chemical Industries, Ltd.] had been dissolved in 333.2 parts of water, followed by mixing at a peripheral speed of 12 m/s for 2 minutes using ULTRADISPERSER. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the system was heated to 60° C. under reduced pressure to remove the solvent. After the removal of the solvent, the resultant was separated by filtration and then dried, affording polyurethane urea resin fine particles (G-18). The (G-18) had a volume-average particle diameter of 5 μm, an SP value of 11.2, and a thermally softening temperature of 127° C.
[Production of Polyurethane Urea Resin Particle (P-18)]

To 140 parts of an aqueous solution in which 2.80 parts of a dispersing agent ["SANSPEARL PS-8" produced by Sanyo Chemical Industries, Ltd.] had been dissolved in 137.2 parts of water was dispersed under stirring 56.2 parts of the (G-18) prepared as described above, so that a slurry was prepared. To this slurry was added 28.7 parts of MEK [boiling point: 78° C.; difference between the SP value thereof and that of the polyurethane urea resin fine particles (G-18): 2.2] as an organic solvent (T), and the temperature was raised to 65° C. under stirring at a peripheral speed of 3.0 m/s and stirring was continued for 3 hours. Thereafter, the solvent was distilled off under reduced pressure, followed by separation by filtration, washing, and drying, so that polyurethane urea resin particles (P-18) were obtained.
[Production of Polyurethane Urea Resin Composition (C-18)]

Powdery polyurethane urea resin composition (C-18) for slush molding was obtained in the same way as in [Production of polyurethane urea resin composition (C-1)] in Example 1 except that the polyurethane urea resin particles (P-1) were replaced by polyurethane urea resin particles (P-18).

Example 19

Production of Polyurethane Urea Resin Fine Particle (G-19)

Into a reaction vessel were charged 100 parts of the urethane prepolymer solution (A-1) obtained in Production Example 1 and 2.6 parts of hexamethylenediamine, and thereto was added 340 parts of an aqueous solution in which 6.80 parts of a dispersing agent ["SANSPEARL PS-8" produced by Sanyo Chemical Industries, Ltd.] had been dissolved in 333.2 parts of water, followed by mixing at a rotation speed represented by a peripheral speed of 12 m/s for 2 minutes using ULTRADISPERSER. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the system was heated to 60° C. under reduced pressure to remove the solvent. After the removal of the solvent, the resultant was separated by filtration and then dried, affording polyurethane urea resin fine particles (G-19). The (G-19) had a volume-average particle diameter of 55 μm, an SP value of 11.2, and a thermally softening temperature of 142° C.

[Production of Polyurethane Urea Resin Particle (P-19)]

To 140 parts of an aqueous solution in which 2.80 parts of a dispersing agent ["SANSPEARL PS-8" produced by Sanyo Chemical Industries, Ltd.] had been dissolved in 137.2 parts of water was dispersed under stirring 65 parts of the (G-19) prepared as described above, so that a slurry was prepared. To this slurry was added 15 parts of THF [boiling point: 66° C.; difference between the SP value thereof and that of the polyurethane urea resin fine particles (G-19): 2.1] as an organic solvent (T), and the temperature was raised to 65° C. under stirring at a peripheral speed of 1.0 m/s and stirring was continued for 3 hours. Thereafter, the solvent was distilled off under reduced pressure, followed by separation by filtration, washing, and drying, so that polyurethane urea resin particles (P-19) were obtained.

[Production of Polyurethane Urea Resin Composition (C-19)]

Powdery polyurethane urea resin composition (C-19) for slush molding was obtained in the same way as in [Production of polyurethane urea resin composition (C-1)] in Example 1 except that the polyurethane urea resin particles (P-1) were replaced by polyurethane urea resin particles (P-19).

Comparative Example 1

Production of Polyurethane Urea Resin Particle (P'-1)

To a reaction vessel was charged 195 parts of an aqueous solution in which 5.8 parts of a dispersing agent ["SANSPEARL PS-8" produced by Sanyo Chemical Industries, Ltd.] had been dissolved in 189.2 parts of water. Subsequently, 102.8 parts of a urethane prepolymer solution (A-1) whose temperature had been adjusted to 75° C. and 2.2 parts of hexamethylenediamine were charged and mixed under stirring using ULTRADISPERSER manufactured by Yamato Scientific Co., Ltd. at a peripheral speed of 23 m/s (revolution speed: 10,000 rpm) and stirred for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, separation by filtration and drying were performed, but the resulting resin was in bulk and no resin particles were obtained.

Comparative Example 2

Production of Polyurethane Urea Resin Particle (P'-2)

To a reaction vessel were added 185.3 parts of an aqueous solution in which 5.9 parts of a dispersing agent ["SANSPEARL PS-8" produced by Sanyo Chemical Industries, Ltd.] had been dissolved in 179.4 parts of water and 9.7 parts of toluene (dielectric constant=2.4), followed by mixing at 20° C. Subsequently, 1.7 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 103.3 parts of the urethane prepolymer solution (A-1) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-2).

[Production of Polyurethane Urea Resin Composition (C'-2)]

Powdery polyurethane urea resin composition (C'-2) for slush molding was obtained in the same way as in [Production of polyurethane urea resin composition (C-1)] in Example 1 except that the polyurethane urea resin particles (P-1) were replaced by polyurethane urea resin particles (P'-2).

Comparative Example 3

Production of Polyurethane Urea Resin Particle (P'-3)

To a reaction vessel were added 136.6 parts of an aqueous solution in which 5.9 parts of a dispersing agent ["SANSPEARL PS-8" produced by Sanyo Chemical Industries, Ltd.] had been dissolved in 130.7 parts of water and 58.4 parts of methanol (dielectric constant=33.0), followed by uniformly stirring at 20° C. Subsequently, 1.7 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 103.3 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-3).

[Production of Polyurethane Urea Resin Composition (C'-3)]

Powdery polyurethane urea resin composition (C'-3) for slush molding was obtained in the same way as in [Production of polyurethane urea resin composition (C-1)] in Example 1 except that the polyurethane urea resin particles (P-1) were replaced by polyurethane urea resin particles (P'-3).

Comparative Example 4

Production of Polyurethane Urea Resin Particle (P'-4)

To a reaction vessel were added 144 parts of an aqueous solution in which 7.2 parts of a dispersing agent ["SANSPEARL PS-8" produced by Sanyo Chemical Industries, Ltd.] was dissolved in 136.8 parts of water and 96 parts of acetone, followed by uniformly stirring at 20° C. Subsequently, 0.8 parts of ethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 59.5 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-4).

[Production of Polyurethane Urea Resin Composition (C'-4)]

Powdery polyurethane urea resin composition (C'-4) for slush molding was obtained in the same way as in [Production of polyurethane urea resin composition (C-1)] in Example 1 except that the polyurethane urea resin particles (P-1) were replaced by polyurethane urea resin particles (P'-4).

Comparative Example 5

Production of Polyurethane Urea Resin Particle (P'-5)

To a reaction vessel were added 194.9 parts of an aqueous solution in which 5.9 parts of a dispersing agent ["SAN-SPEARL PS-8" produced by Sanyo Chemical Industries, Ltd.] was dissolved in 189 parts of water and 0.1 parts of methyl acetate, followed by uniformly stirring at 20° C. Subsequently, 2.5 parts of isophoronediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 102.5 parts of the urethane prepolymer solution (A-1) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-5).

[Production of Polyurethane Urea Resin Composition (C'-5)]

Powdery polyurethane urea resin composition (C'-5) for slush molding was obtained in the same way as in [Production of polyurethane urea resin composition (C-1)] in Example 1 except that the polyurethane urea resin particles (P-1) were replaced by polyurethane urea resin particles (P'-5).

Comparative Example 6

Production of Polyurethane Urea Resin Particle (P'-6)

To a reaction vessel was added 144 parts of an aqueous solution in which 7.2 parts of a dispersing agent ["SAN-SPEARL PS-8" produced by Sanyo Chemical Industries, Ltd.] was dissolved in 136.8 parts of water. Subsequently, 0.8 parts of ethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 59.5 parts of the urethane prepolymer solution (A-2) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-6).

[Production of Polyurethane Urea Resin Composition (C'-6)]

Powdery polyurethane urea resin composition (C'-6) for slush molding was obtained in the same way as in [Production of polyurethane urea resin composition (C-1)] in Example 1 except that the polyurethane urea resin particles (P-1) were replaced by polyurethane urea resin particles (P'-6).

Comparative Example 7

Production of Polyurethane Urea Resin Particle (P'-7)

To a reaction vessel were added 103.3 parts of the urethane prepolymer solution (A-1) whose temperature had been adjusted to 50° C., 19.5 parts of THF and 1.7 parts of hexamethylenediamine and mixed, and then thereto was added 5.9 parts, 175.5 parts of a dispersing agent ["SAN-SPEARL PS-8" produced by Sanyo Chemical Industries, Ltd.], followed by mixing at a peripheral speed of 23 m/s (revolution speed: 10,000 rpm) for 1 minute by using ULTRADISPERSER manufactured by Yamato Scientific Co., Ltd. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, separation by filtration and drying were performed, but the resulting resin was in bulk and no resin particles were obtained.

Comparative Example 8

Production of MEK Ketimine Compound of Diamine

While refluxing 116 parts of hexamethylene diamine and 288 parts of MEK (4 molar times in amount relative to the amount of the diamine) at 80° C. for 24 hours, water generated was removed to the outside of the system. Subsequently, unreacted MEK was removed under reduced pressure, affording a MEK ketimine compound of hexamethylenediamine.

[Production of Polyurethane Urea Resin Particle (P'-8)]

To a reaction vessel were added 157.9 parts of an aqueous solution in which 5.9 parts of a dispersing agent ["SAN-SPEARL PS-8" produced by Sanyo Chemical Industries, Ltd.] was dissolved in 152 parts of water and 37.1 parts of MEK, followed by uniformly stirring at 20° C. Subsequently, 4.5 parts of the MEK ketimine compound was added under stirring using ULTRADISPERSER manufactured by Yamato Scientific Co., Ltd. at a peripheral speed of 23 m/s (revolution speed: 10,000 rpm) and mixed for 1 minute. Subsequently, 103.3 parts of the urethane prepolymer solution (A-1) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P'-8).

[Production of Polyurethane Urea Resin Composition (C'-8)]

Powdery polyurethane urea resin composition (C'-8) for slush molding was obtained in the same way as in [Production of polyurethane urea resin composition (C-1)] in Example 1 except that the polyurethane urea resin particles (P-1) were replaced by polyurethane urea resin particles (P'-8).

In Tables 1 to 3 were shown the volume-average particle diameters of the primary particles in Examples 1 to 19, Comparative Examples 2 to 6, and 8, and the results of measurement or evaluation of physical properties by the methods described below for the polyurethane urea resin particles obtained in Examples 1 to 19 and comparative polyurethane urea resin particles obtained in Comparative Examples 2 to 6 and 8.

<Melting Point>

A flow tester, CFT-500 manufactured by SHIMADZU CORPORATION, was used to raise the temperature of the resin at a constant rate under conditions described below, and a temperature at which the outflow amount turned to ½ of the total amount was defined as the melting point.

Load: 5 kg
Die: 0.5 mmΦ-1 mm
Temperature-raising rate: 5° C./min

<Glass Transition Temperature (Tg)>

Measurement was carried out under the following conditions using differential scanning calorimetry ["RDC220 Robot DSC" manufactured by Seiko Instruments Inc.]. Measurement conditions: the amount of sample is 5 mg.

(1) The sample is heated from −100° C. to 100° C. at a heating rate of 20° C./min and is held at 100° C. for 10 minutes.

(2) The sample is cooled from 100° C. to −100° C. at a cooling rate of −90° C./min and is held at −100° C. for 10 minutes.

(3) The sample is heated from −100° C. to 100° C. at a heating rate of 20° C./min.

Analysis method: Tg is calculated from a DSC curve taken during the second heating.

<Thermally Softening Temperature>

Using a flow tester, CFT-500 manufactured by SHIMADZU CORPORATION, the temperature was raised at a constant rate under the conditions described below, and a temperature at which the resin started to soften was defined as the thermally softening temperature.

Load: 5 kg
Die: 0.5 mmΦ-1 mm
Temperature-raising rate: 5° C./min

<Average Particle Diameter of Primary Particles>

The average particle diameter of primary particles in Examples 1 to 6, Example 20 disclosed below, Comparative Examples 2 to 6, and Comparative Example 8 was measured by the following method.

After 10 seconds from charging of a urethane prepolymer solution, 10 g of a sample was taken, diluted with 100 g of water, and then dried. Thus, a mixture of spherical primary particles and polyurethane urea resin particles (P) having irregularities on their surfaces formed from the primary particles coalesced was obtained. For this mixture, a photograph was taken at 10,000 magnifications with a scanning electron microscope ("S-800" manufactured by Hitachi Ltd.), and then 80 spherical primary particles were selected at random from the resulting image (resolution: 1280×1024 pixels). These were introduced to an image analyzer (LUSEX3, manufactured by Nireco Corporation) and analyzed. Thus, an average of particle diameter values was calculated.

<Shape Factors SF1 and SF2>

In the measurement of the shape factors SF1 and SF2, the particles were photographed with a scanning electron microscope ("S-800", manufactured by Hitachi Ltd.) at 300 magnifications for particles having a volume-average particle diameter of 20 μm or more and less than 40 μm; at 160 magnifications for particles having a volume-average particle diameter of 40 μm or more and less than 75 μm; at 80 magnifications for particles having a volume-average particle diameter of 75 μm or more and less than 150 μm; at 40 magnifications for particles having a volume-average particle diameter of 150 μm or more and less than 300 μm; and at 25 magnifications for particles having a volume-average particle diameter of 300 μm or more. From the resultant images (resolution: 128q0×1024 pixels), 80 particles were selected at random. The selected particles were introduced into an image analyzer ("LUSEX3", manufactured by Nireco Corporation) and analyzed. Thus, the average SF1 value and the average SF2 value were calculated.

<Volume-Average Particle Diameter and Particle Diameter Distribution (Cv)>

The volume-average particle diameter and the particle diameter distribution (Cv) in the present invention were measured with a laser diffraction type particle diameter distribution analyzer ["Microtrac MT3000II" manufactured by Nikkiso Co., Ltd.].

<Total Content of Dicondensates of Ketones>

(1) Preparation of Test Sample

Into a 300 ml eggplant flask was fed 50 g of test sample polyurethane urea resin particles, and the eggplant flask was attached to a Tenax tube collector. The eggplant flask was heated on a silicone oil bath at 100° C. for 1 hour and volatile components were collected in a Tenax tube.

(2) GC/MS Analysis

The Tenax tube was attached to an autosampler of a gas chromatographic analyzer ["GC/MS QP2010plus" manufactured by SHIMADZU CORPORATION] at room temperature, and GC/MS analysis was performed under the following conditions. Thus, the total content of dicondensates was measured using a calibration curve, which is described below.

Column: ZB-5 [manufactured by SHIMADZU CORPORATION]
Column length: 30 mm, inner diameter of the column: 0.25 mm, wall thickness of the column: 0.25 μm
Column temperature ramp program: from 40° C. to 300° C. (10° C./min)
Temperature of vaporization chamber in which the Tenax tube was mounted: 25° C.
Carrier gas: helium
Split ratio: 10

(3) GC/MS Calibration Curve

Dicondensates of acetone, MEK, and MIBK, namely, 4-methyl-3-penten-2-one, 5-methyl-4-hepten-3-one, 3,4-dimethyl-3-hexen-2-one, 3-isopropyl-4,6-dimethyl-3-hepten-2-one, and 2,6,8-trimethyl-5-nonen-4-one are synthesized as standard samples. Each of the dicondensates is diluted with methanol to 30 ppm, 100 ppm, 500 ppm, 2,000 ppm, and 10,000 ppm, thereby preparing samples for a calibration curve. Each of the samples, 5 μl, was injected into the Tenax tube with a micro syringe, and then methanol was removed by blowing nitrogen into the Tenax tube for 5 minutes. The prepared samples for a calibration curve were measured under the above-described measuring conditions and peak area values were plotted versus concentrations, so that a GC/MS calibration curve was produced.

<Method of Odor Evaluation>

(1) Polyurethane urea resin particles were filled into a grain-patterned Ni electrocast mold that had beforehand been heated to 230° C., and 10 seconds later, excess resin particles were discharged. Sixty seconds later, the mold was cooled with water to prepare a skin (1 mm thick).

(2) From this skin were taken three specimens each sized in 3 cm by 3 cm. The respective specimens were placed in three 4-L stainless steel containers and heated at 100±2° C. for 1 hour in a wind-circulation dryer. Thereafter, the containers were taken out and cooled to room temperature.

(3) The lid of each container was opened slightly, and for each container, three panelists smelled one after another.

(4) Each panelist compared the odor emitted from a molded skin and the odor of odor paper immersed 1 cm from its tip into an odor standard substance "C10$^{-5.0}$" produced by Daiichi Yakuhin Sangyo Ltd. and evaluated the odor according to the following criteria. The results evaluated by the twelve panelists were summarized and an average was calculated.

[Evaluation Criteria]

5: Odor that is stronger than the standard (powerful odor)
4: Odor that is a little stronger than the standard (strong odor)
3: Odor that is the same as the standard (easily noticeable odor)
2: Odor that is a little weaker than the standard (source-recognizable, weak odor)
1: Odor that is weaker than the standard (barely recognizable odor)
0: No odor <Flow-Down Time>

Using a bulk specific gravity meter (in accordance with JIS-K6720) manufactured by Tsutsui Scientific Instruments Co., Ltd., a time taken by 100 cm$^3$ of a material to flow down through a funnel was measured. The case that the flow-down time was less than 20 seconds was judged as good powder flowability (○), whereas the case that the flow-down time exceeded 20 seconds was judged as poor powder flowability (x).

<Number of Particles (F) which were Each Aggregate of Pigment Particles (E)>

Resin particles, 400 particles in total, were observed at 100 magnifications by using a microscope. On a monitor projecting at 100 magnifications, the number of particles (F) visually observed, which were aggregates of pigment particles (E), was counted.

<Discoloration>

The temperature of the front surface of an A4-size iron plate put on a hot plate was set to 250° C. Thereafter, 50 g of the resultant resin particles was put onto the plate. In order to make the film thickness of the particles even, the surface was leveled. After 90 seconds therefrom, the system was put into a water bath having a temperature of 25° C. to be cooled. The leveled resin film was peeled from the iron plate. From the film, a test piece was cut off which had a width of about 40 mm and a length of about 200 mm. The piece was attached to a plane abrasion tester ("FR-T" manufactured by Suga Test Instruments Co., Ltd.), and its abrader was covered with a white cotton cloth, and then the cloth was fixed. While the load of the abrader was set to 300 g, the test piece was reciprocated 100 times and discoloration was evaluated. When the white cotton cloth was not colored, the test piece was estimated to be good (○), whereas when the cloth was colored, the test piece was estimated to be bad (x).

<Evaluation of Pinholes>

Polyurethane urea resin particles were filled into a grain-patterned Ni electrocast mold that had beforehand been heated to 210° C., and 10 seconds later, excess resin particles were discharged. Sixty seconds later, the mold was cooled with water to prepare a skin. The surface of each of the resultant molded skins was observed with a microscope (at 10 magnifications) and then a situation as to whether or not pinholes were formed was examined. The case that there were 20 or less pinholes in an area sized 10 cm by 10 cm was evaluated as good (○), whereas the case that there were more than 20 pinholes was evaluated as poor (x).

TABLE 1

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Physical property value | Polyurethane urea resin (D) | Urea group concentration | % by weight | 2.6 | 2.6 | 2.8 | 2.6 | 2.8 | 2.8 | 2.6 | 2.6 | 2.8 |
| | | Total of urethane group concentration + urea group concentration | % by weight | 10.6 | 10.6 | 11.4 | 10.6 | 11.4 | 11.4 | 10.6 | 10.6 | 11.4 |
| | | Melting point | ° C. | 209 | 209 | 215 | 209 | 215 | 215 | 209 | 209 | 215 |
| | | Glass transition temperature | ° C. | −34 | −34 | −43 | −34 | −43 | −43 | −34 | −34 | −43 |
| | | SP value | — | — | — | — | — | — | — | 11.2 | 11.2 | 10.3 |
| | | Thermally softening temperature | ° C. | — | — | — | — | — | — | 131 | 127 | 134 |
| | Primary particle | Average particle diameter | μm | 5 | 2 | 55 | 0.3 | 22 | 16 | — | — | — |
| | Polyurethane urea resin fine particle (G) | Volume-average particle diameter | μm | — | — | — | — | — | — | 18 | 5 | 18 |
| | Polyurethane urea resin particle (P) | Shape factor SF1 | % | 136 | 105 | 170 | 112 | 151 | 149 | 150 | 105 | 153 |
| | | Shape factor SF2 | % | 210 | 220 | 132 | 150 | 201 | 199 | 210 | 190 | 203 |
| | | Volume-average particle diameter | μm | 172 | 110 | 471 | 26 | 252 | 129 | 145 | 110 | 198 |
| | | Particle diameter distribution CV | % | 25 | 20 | 49 | 46 | 34 | 30 | 26 | 20 | 31 |
| | Powdery polyurethane urea resin composition (C) | Volume-average particle diameter | μm | 175 | 115 | 472 | 30 | 254 | 132 | 147 | 115 | 201 |
| | | Particle diameter distribution CV | % | 26 | 22 | 50 | 47 | 35 | 31 | 28 | 22 | 33 |

TABLE 1-continued

|  |  |  |  | Example |  |  |  |  |  |  |  |  |
|---|---|---|---|---|---|---|---|---|---|---|---|---|
|  |  |  |  | 1 | 2 | 3 | 4 | 5 | 6 | 7 | 8 | 9 |
| Evaluation result | Powdery polyurethane urea resin composition (C) | Total content of dicondensate of ketone | ppm | 0 | 0 | 0 | 0 | 0 | 0 | 0 | 0 | 0 |
|  |  | Odor test | Grade | 0 | 0 | 0 | 0 | 0 | 0 | 0 | 0 | 0 |
|  |  | Flow-down period | s | 14.9 | 12.8 | 18.5 | 19.7 | 15.9 | 14.1 | 15.6 | 17.1 | 15.2 |
|  |  | Powder fluidity | — | ○ | ○ | ○ | ○ | ○ | ○ | ○ | ○ | ○ |
|  |  | Particles (F) each of which is aggregate | Aggregated particles/100-particles | 0.25 | 0.25 | 0.75 | 0.5 | 0.25 | 0.25 | 0 | 0.75 | 0.25 |
|  |  | Discoloration | — | ○ | ○ | ○ | ○ | ○ | ○ | ○ | ○ | ○ |
|  |  | Evaluation of pinholes | — | ○ | ○ | ○ | ○ | ○ | ○ | ○ | ○ | ○ |

TABLE 2

|  |  |  |  | Example |  |  |  |  |  |  |  |  |
|---|---|---|---|---|---|---|---|---|---|---|---|---|
|  |  |  |  | 10 | 11 | 12 | 13 | 14 | 15 | 16 | 17 | 18 |
| Physical property value | Polyurethane urea resin (D) | Urea group concentration | % by weight | 2.6 | 2.8 | 2.8 | 1.0 | 2.6 | 2.6 | 1.0 | 2.6 | 2.6 |
|  |  | Total of urethane group concentration + urea group concentration | % by weight | 10.6 | 11.4 | 11.4 | 9.7 | 10.6 | 10.6 | 9.7 | 10.6 | 10.6 |
|  |  | Melting point | ° C. | 209 | 215 | 215 | 195 | 209 | 209 | 195 | 209 | 209 |
|  |  | Glass transition temperature | ° C. | −34 | −43 | −43 | −39 | −34 | −34 | −39 | −34 | −34 |
|  |  | SP value | — | 11.2 | 10.3 | 10.3 | 11.2 | 11.2 | 11.2 | 11.2 | 11.2 | 11.2 |
|  |  | Thermally softening temperature | ° C. | 125 | 145 | 130 | 137 | 131 | 131 | 141 | 127 | 127 |
|  | Primary particle | Average particle diameter | μm | — | — | — | — | — | — | — | — | — |
|  | Polyurethane urea resin fine particle (G) | Volume-average particle diameter | μm | 0.2 | 58 | 10 | 7 | 18 | 18 | 22 | 5 | 5 |
|  | Polyurethane urea resin particle (P) | Shape factor SF1 | % | 131 | 194 | 158 | 190 | 152 | 151 | 185 | 177 | 157 |
|  |  | Shape factor SF2 | % | 123 | 239 | 221 | 180 | 210 | 211 | 220 | 190 | 212 |
|  |  | Volume-average particle diameter | μm | 23 | 498 | 182 | 103 | 150 | 160 | 155 | 210 | 182 |
|  |  | Particle diameter distribution CV | % | 48 | 53 | 35 | 34 | 24 | 20 | 25 | 42 | 38 |
|  | Powdery polyurethane urea resin composition (C) | Volume-average particle diameter | μm | 27 | 499 | 185 | 105 | 152 | 164 | 158 | 213 | 186 |
|  |  | Particle diameter distribution CV | % | 50 | 54 | 36 | 35 | 26 | 22 | 27 | 44 | 40 |
| Evaluation result | Powdery polyurethane urea resin composition (C) | Total content of dicondensate of ketone | ppm | 0 | 0 | 0 | 0 | 0 | 0 | 0 | 0 | 0 |
|  |  | Odor test | Grade | 0 | 0 | 0 | 0 | 0 | 0 | 0 | 0 | 0 |
|  |  | Flow-down period | s | 20 | 19.2 | 16.1 | 19.8 | 15.4 | 14.5 | 17.2 | 18.7 | 16.2 |
|  |  | Powder fluidity | — | ○ | ○ | ○ | ○ | ○ | ○ | ○ | ○ | ○ |
|  |  | Particles (F) each of which is aggregate | Aggregated particles/100-particles | 0.5 | 0.25 | 0.25 | 0.75 | 0 | 0 | 1.00 | 0.5 | 0.5 |
|  |  | Discoloration | — | ○ | ○ | ○ | ○ | ○ | ○ | ○ | ○ | ○ |
|  |  | Evaluation of pinholes | — | ○ | ○ | ○ | ○ | ○ | ○ | ○ | ○ | ○ |

TABLE 3

|  |  |  |  | Example | Comparative Example |  |  |  |
|---|---|---|---|---|---|---|---|---|
|  |  |  |  | 19 | 1 | 2 | 3 | 4 |
| Physical property value | Polyurethane urea resin (D) | Urea group concentration | % by weight | 1.0 | No particles were formed. | 2.6 | 2.8 | 2.8 |
|  |  | Total of urethane group concentration + urea group concentration | % by weight | 9.7 |  | 10.6 | 11.4 | 11.4 |
|  |  | Melting point | ° C. | 195 |  | 209 | 215 | 215 |
|  |  | Glass transition temperature | ° C. | −39 |  | −34 | −43 | −43 |
|  |  | SP value | — | 11.2 |  | — | — | — |
|  |  | Thermally softening temperature | ° C. | 142 |  | — | — | — |
|  | Primary particle | Average particle diameter | μm | — |  | 58 | 0.04 | 0.08 |
|  | Polyurethane urea resin fine particle (G) | Volume-average particle diameter | μm | 55 |  | — | — | — |
|  | Polyurethane urea resin particle (P) | Shape factor SF1 | % | 190 |  | 280 | 103 | 105 |
|  |  | Shape factor SF2 | % | 238 |  | 230 | 110 | 104 |
|  |  | Volume-average particle diameter | μm | 137 |  | 980 | 15 | 16 |
|  |  | Particle diameter distribution CV | % | 27 |  | 82 | 20 | 21 |

TABLE 3-continued

| | | | | | | | |
|---|---|---|---|---|---|---|---|
| Evaluation result | Powdery polyurethane urea resin composition (C) | Volume-average particle diameter | μm | 140 | 982 | 18 | 18 |
| | | Particle diameter distribution CV | % | 29 | 83 | 21 | 22 |
| | Powdery polyurethane urea resin composition (C) | Total content of dicondensate of ketone | ppm | 0 | 0 | 0 | 0 |
| | | Odor test | Grade | 0 | 0 | 0 | 0 |
| | | Flow-down period | s | 18.0 | 31.2 | 27.4 | 33.6 |
| | | Powder fluidity | — | ○ | X | X | X |
| | | Particles (F) each of which is aggregate | Aggregated particles/100-particles | 0.75 | 0.25 | 2.25 | 1.75 |
| | | Discoloration | — | ○ | ○ | X | X |
| | | Evaluation of pinholes | — | ○ | X | ○ | ○ |

| | | | | Comparative Example | | | |
|---|---|---|---|---|---|---|---|
| | | | | 5 | 6 | 7 | 8 |
| Physical property value | Polyurethane urea resin (D) | Urea group concentration | % by weight | 2.6 | 2.8 | No particles were formed. | 2.6 |
| | | Total of urethane group concentration + urea group concentration | % by weight | 10.6 | 11.4 | | 10.6 |
| | | Melting point | ° C. | 209 | 215 | | 209 |
| | | Glass transition temperature | ° C. | −34 | −43 | | −34 |
| | | SP value | — | — | — | | — |
| | | Thermally softening temperature | ° C. | — | — | | — |
| | Primary particle | Average particle diameter | μm | 240 | 166 | | 5 |
| | Polyurethane urea resin fine particle (G) | Volume-average particle diameter | μm | — | — | | — |
| | Polyurethane urea resin particle (P) | Shape factor SF1 | % | 103 | 105 | | 138 |
| | | Shape factor SF2 | % | 106 | 109 | | 208 |
| | | Volume-average particle diameter | μm | 240 | 166 | | 174 |
| | | Particle diameter distribution CV | % | 55 | 31 | | 26 |
| | Powdery polyurethane urea resin composition (C) | Volume-average particle diameter | μm | 245 | 169 | | 177 |
| | | Particle diameter distribution CV | % | 51 | 33 | | 27 |
| Evaluation result | Powdery polyurethane urea resin composition (C) | Total content of dicondensate of ketone | ppm | 0 | 0 | | 1700 |
| | | Odor test | Grade | 0 | 0 | | 4 |
| | | Flow-down period | s | 25.1 | 18.2 | | 15.2 |
| | | Powder fluidity | — | X | ○ | | ○ |
| | | Particles (F) each of which is aggregate | Aggregated particles/100-particles | 2.25 | 2 | | 0.25 |
| | | Discoloration | — | X | X | | ○ |
| | | Evaluation of pinholes | — | X | ○ | | ○ |

Example 20

Production of Urethane Prepolymer Solution (A-4)

A reaction vessel equipped with a thermometer, a stirrer, and a nitrogen inlet tube was charged with 298 parts of polyethylene phthalate (terephthalic acid/isophthalic acid=50/50) diol having an Mn of 900 and a Tg of 20° C., and further with 30 parts of a polyester diol which was a polycondensate of ethylene glycol (166 parts), butylene glycol (256 parts), terephthalic acid (181 parts), isophthalic acid (181 parts) and adipic acid (338 parts) and had an Mn of 950. After heating at 100° C., 1216 parts of polybutylene adipate having an Mn of 1,000 and a Tg of −60° C. and 27.6 parts of 1-octanol were charged. After purging with nitrogen, the mixture was heated to 110° C. under stirring to melt and then cooled down to 60° C. Subsequently, 313.6 parts of hexamethylene diisocyanate was charged and then the mixture was caused to react at 85° C. for 6 hours. Subsequently, after cooling down to 60° C., 317 parts of MEK and 2.7 parts of a stabilizer ["IRGANOX 1010" produced by Ciba Specialty Chemicals] were added and mixed uniformly, affording a urethane prepolymer solution (A-4). The NCO content of the resultant urethane prepolymer solution (A-4) was 0.8%.

[Production of Polyurethane Urea Resin Particle (P-20)]

To a reaction vessel were added 168.3 parts of an aqueous solution in which 8.7 parts of a dispersing agent ["SAN-SPEARL PS-8" produced by Sanyo Chemical Industries, Ltd.] had been dissolved in 159.6 parts of water and 50.3 parts of MEK, followed by uniformly stirring at 20° C. Subsequently, 0.9 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 79.7 parts of the prepolymer solution (A-4) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-20).

[Production of Polyurethane Urea Resin Composition (C-20)]

Polyurethane urea resin composition (C-20) was obtained in the same way as in Example 1 except that the polyurethane urea resin particles (P-1) in [Production of polyurethane urea resin composition (C-1)] in Example 1 were replaced by polyurethane urea resin particles (P-20). Physical properties relating to the (C-20) are shown in Table 4.

TABLE 4

| | | | | Example 20 |
|---|---|---|---|---|
| Physical property value | Polyurethane urea resin (D) | Urea group concentration | % by weight | 1.0 |
| | | Total of urethane group concentration + urea group concentration | % by weight | 9.7 |
| | | Melting point | ° C. | 195 |
| | | Glass transition temperature | ° C. | −39 |
| | Primary particle | Average particle diameter | μm | 5 |
| | Powdery polyurethane urea resin composition (C) | Shape factor SF1 | % | 151 |
| | | Shape factor SF2 | % | 210 |
| | | Volume-average particle diameter | μm | 167 |
| | | Particle diameter distribution CV | % | 29 |

Example 21

Production of Polyurethane Urea Resin Particle (P-21)

Polyurethane urea resin composition (C-21) was obtained in the same way as in Example 20 except that 79.7 parts of the urethane prepolymer solution (A-4) in Example 20 was replaced by a mixture of 79.7 parts of the urethane prepolymer solution (A-4) and 54.7 parts of polycarbodiimide ["Carbodilite V-09B" produced by Nisshinbo Holdings Inc.: polycarbodiimide (Mn: 15,000, terminal group: methoxy group, form: 70% MEK solution) prepared by polymerizing $\alpha,\alpha,\alpha',\alpha'$-tetramethylxylylene diisocyanate].

For the (C-21) obtained and the polyurethane urea resin composition (C-20) of Example 20, the results obtained by measuring or evaluating physical properties by the methods described below are shown in Table 5.
<Preparation of Skin>

Polyurethane urea resin particles for slush molding were filled into a grain-patterned Ni electrocast mold that had beforehand been heated to 210° C., and 5 seconds later, excess resin particles were discharged. Sixty seconds later, the mold was cooled with water to prepare a skin (0.3 mm thick). A 1.0 mm thick skin was prepared in the same way as described above except for discharging excess resin particle 10 seconds after the filling.
<Hygrothermal Aging Test>

A 1.0 mm thick molded skin was treated in a thermohygrostat at a temperature of 80° C. and a humidity of 95% RH for 400 hours. After the test, the tear strength of the skin was measured in accordance with JIS K6252-2004 and was compared with the initial strength.
<Accelerated Bleeding Test>

A 0.3 mm thick molded skin was put into a bag and then treated in a sealed state in the dark for 2 months. The molded skin after the test was observed visually, and the occurrence of bleeding out was evaluated according to the following criteria.

0: No white matter is found on both the rear surface and the grain-patterned surface.
1: White matter is found partly on the rear surface.
2: White matter is found on the entire rear surface.
3: White matter is found on the entire rear surface and also partly on the grain-patterned surface.
4: White matter is found on both the entire rear surface and the entire grain-patterned surface.

TABLE 5

| | | | Example 20 | Example 21 |
|---|---|---|---|---|
| Tear strength on hygrothermal aging test (1.0 mm) | Before test | kN/m | 75 | 70 |
| | After test | kN/m | 44 | 65 |
| Bleed out (0.5 mm) | | | — | 0 | 0 |

Example 22

Production of Polyurethane Urea Resin Composition (C-22)

Polyurethane urea resin composition (C-22) was obtained in the same way as in Example 20 except that 1.0 parts of dipentaerythritol pentaacrylate [DA600; produced by Sanyo Chemical Industries, Ltd.], a radically polymerizable unsaturated group-containing compound, was charged together with the (P-20) in [Production of polyurethane urea resin composition (C-20)] in Example 20.

For the (C-22) obtained and the polyurethane urea resin composition (C-20) of Example 20, the results obtained by measuring or evaluating physical properties by the methods described below are shown in Table 6.
<Preparation of Skin>

Polyurethane urea resin particles for slush molding were filled into a grain-patterned Ni electrocast mold that had beforehand been heated to 210° C., and 5 seconds later, excess polyurethane urea resin particles were discharged. Sixty seconds later, the mold was cooled with water to prepare a skin (0.3 mm thick).
<Method for Measuring Tensile Strength and Elongation>

From a molded skin were punched out three tensile test specimens of the dumbbell No. 1 type of JIS K6301, and marking lines were drawn at intervals of 40 mm on the center of each specimen. The minimum value of thickness taken at five positions located between marked lines was adopted as the sheet thickness. Each of the test pieces was attached to an autograph under a 25° C. atmosphere and was pulled at a rate of 200 mm/min. The tensile strength, the elongation, and the stress achieved before the specimen broke were measured.
<Preparation of Padding Material>

Each of the skins prepared by the method described above was set to a mold, and then a urethane foam forming component [composed of 95 parts of EO chipped polypropylene triol (number average molecular weight: 5,000), 5 parts of triethanolamine, 2.5 parts of water, 1 part of triethylamine, and 61.5 parts of polymeric MDI] was added on the skin and was allowed to foam and bond firmly together. Thus, padding materials were obtained.
<Measurement of Asker C Hardness>

Using an Asker C hardness meter (manufactured by Kobunshi Keiki Co., Ltd.), the hardness of the surface of each padding material was measured in accordance with JIS K7312.

<Check on Color Fading>

Skin samples were visually observed directly and were evaluated according to the following criteria.

○: No discoloration was observed.
Δ: Discoloration was observed.
×: Severe discoloration was observed.

<Measurement of Gloss>

Gloss measurement was performed by using a glossimeter ("Portable Gloss Meter GMX-202" manufactured by Murakami Color Research Laboratory Co., Ltd.). The higher the gloss value is, the glossier the sample is.

<Evaluation of Touch Feeling>

The surface of each of the sheets obtained in Examples and Comparative Examples was touched with fingers, and the touch feeling was evaluated according to the following criteria.

○: No difference in the hardness of a padding material is felt before and after the heat resistance test.
×: The padding material is felt to have become harder than before the heat resistance test.

<Measurement of Asker C Hardness, Color Fading, Gloss, Tensile Strength, Elongation, and Touch Feeling after Heat Aging Resistance Test>

Each padding material was left at rest at 130° C. for 600 hours in a wind-circulation drier. Subsequently, it was left at rest at 25° C. for 24 hours. Subsequently, Asker C hardness, color fading, gloss, and touch feeling were checked by the method described above. All the samples had a gloss of 1.1 at the start of the test. Subsequently, a foam layer was removed and the tensile strength and the elongation of the skin were measured by the method described above.

TABLE 6

|  |  |  |  | Example 20 | Example 22 |
|---|---|---|---|---|---|
| Before heat resistance test | Skin | Skin thickness | mm | 0.3 | 0.3 |
|  |  | Tensile strength | MPa | 20 | 26 |
|  |  | Elongation | % | 500 | 550 |
|  |  | Maximum stress at break | N | 70 | 78 |
|  | Padding material | Asker C hardness | — | 54 | 55 |
| After heat resistance test | Skin | Skin thickness | mm | 0.3 | 0.3 |
|  |  | Tensile strength | MPa | 10 | 14 |
|  |  | Elongation | % | 450 | 500 |
|  |  | Maximum stress at break | N | 34 | 41 |
|  |  | Asker C hardness | — | 54 | 56 |
|  | Padding material | Touch feeling | — | ○ | ○ |
|  |  | Color fading | — | ○ | ○ |
|  |  | Gloss |  | 1.5 | 1.2 |

Example 23

Production of Polyurethane Urea Resin Particle (P-23)

1.0 parts of straight silicone oil [SH200-10000CS, produced by Dow Corning Toray Co., Ltd.] as a releasing agent and 1.5 parts of silica fine particles [Sybloc 5200, produced by Grace Japan Kabushiki Kaisha] as an inorganic fine particles were mixed for 5 minutes with a small universal mixer, affording oil-absorbing inorganic fine particles in which the straight silicone oil had beforehand been absorbed in the silica fine particles.

Subsequently, 100 parts of the polyurethane urea resin composition (C-20) obtained in Example 20 and 2.5 parts of the oil-absorbing inorganic fine particles were charged into the small universal mixer and mixed for 5 minutes, affording polyurethane urea resin composition (C-23).

For the (C-23) obtained and the polyurethane urea resin composition (C-20) of Example 20, the results obtained by measuring or evaluating physical properties by the methods described below are shown in Table 7.

<Preparation of Skin>

Polyurethane urea resin particles for slush molding were filled into a grain-patterned Ni electrocast mold that had beforehand been heated to 210° C., and 10 seconds later, excess polyurethane urea resin particles were discharged. Sixty seconds later, the mold was cooled with water to prepare a skin (1 mm thick).

<Abrasion Resistance>

A 1 mm thick molded skin was stuck on pasteboard, followed by cutting into a size of 10 cm×10 cm. A hole was formed at the center, and the resulting piece was fixed to a Taber type abrasion tester (manufactured by Tosoku Seimitsu Kogyo Co.) and then a 500-rotation abrasion was performed under a load of 500 g using a CS-10 as an abrasion ring. The abrasion resistance was evaluated according to the following criteria.

5: No abrasion of grains is observed.
4: Abrasion of grains is observed slightly.
3: Abrasion of grains is observed clearly.
2: Grains have worn remarkably and a level difference is observed.
1: Grains have worn remarkably and a crack is observed.

<Continuous Moldability>

Using the same Ni electrocast mold, skins were prepared repeatedly 50 shots by the above-described method except for failing to apply the external releasing agent in the 2nd and later shots, and then the gloss of the grained surfaces of the 1st shot skin and the 50th shot skin was measured with a glossimeter [GMX-202, manufactured by Murakami Color Research Laboratory Co., Ltd.]. The continuous moldability was evaluated on the basis of the difference in gloss between the 50th shot and the 1st shot; a smaller difference indicates better continuous moldability.

<Moldability of Projecting Part>

A depression of 1 mm depth and 0.5 mm width (the side wall of the depression meets at right angle with the bottom) was formed in a grain-patterned Ni electrocast mold, and a skin (1 mm thick) was prepared under the same conditions as those for the above-described preparation of a skin. Because the skin in the depression was to be projected, the shape thereof was observed visually and evaluated according to the following criteria.

3: The projecting part has an edge.
2: The projecting part has both a part without an edge and a part with an edge.
1: The projecting part has no edges.

The edge as referred to above means an edge of the projecting part of the skin formed at the portion where the side wall and the bottom of the depression of the Ni electrocast mold meet together; the better the shape of the depression of the Ni electrocast mold has been reproduced by this edge, the better the moldability of the projecting part.

TABLE 7

|  | Example 20 | Example 23 |
|---|---|---|
| Abrasion resistance | 3 | 4 |
| Continuous moldability | 0.3 | 0.2 |
| Moldability of projecting part | 2 | 3 |

Example 24

Production of Monool

A reaction vessel equipped with a cooling tube, a stirrer, and a nitrogen inlet tube was charged with 384 parts of ethyl acetate, and then 192 parts of trimellitic anhydride, 62 parts of ethylene glycol, and 202 parts of triethylamine were charged and caused to react at 80° C. for 2 hours. Thereafter, 252 parts of benzyl chloride was charged, and the resultant mixture was caused to react at 70° C. for 2 hours. Subsequently, liquid separation and desolventization were performed, affording the target monool. The hydroxyl value of the resulting active hydrogen-containing compound was measured and then the molecular weight thereof was calculated to be 434.

[Production of Urethane Prepolymer Solution (A-5)]

A reaction vessel equipped with a thermometer, a stirrer, and a nitrogen inlet tube was charged with 93.1 parts of polyethylene isophthalate diol having an Mn of 2,300, 349.6 parts of polybutylene adipate diol having an Mn of 1,000, 6.0 parts of the monool obtained as above, and 5.3 parts of benzyl alcohol. After purging with nitrogen, the mixture was heated to 110° C. under stirring to melt and then cooled down to 50° C. Subsequently, 400.3 parts of MEK, 112.9 parts of hexamethylene diisocyanate, and 3.8 parts of isophorone diisocyanate were charged, and then they were caused to react at 90° C. for 6 hours. Subsequently, after cooling down to 70° C., 2.7 parts of a stabilizer ["IRGANOX 1010" produced by Ciba Specialty Chemicals] was added and mixed uniformly, affording a urethane prepolymer solution (A-5). The NCO content of the resultant prepolymer solution (A-5) was 1.26%.

[Production of Polyurethane Urea Resin Particle (P-24)]

To a reaction vessel were added 168.3 parts of an aqueous solution in which 8.7 parts of a dispersing agent ["SANSPEARL PS-8" produced by Sanyo Chemical Industries, Ltd.] had been dissolved in 159.6 parts of water and 50.3 parts of MEK, followed by uniformly stirring at 20° C. Subsequently, 1.3 parts of hexamethylenediamine was added under stirring using ULTRADISPERSER manufactured by Yamato Scientific Co., Ltd. at a peripheral speed of 23 m/s (revolution speed: 10,000 rpm) and mixed for 1 minute. Subsequently, 79.7 parts of the urethane prepolymer solution (A-5) whose temperature had been adjusted to 75° C. was charged and mixed under continuous stirring, followed by mixing at a peripheral speed of 23 m/s for 2 minutes. The resultant mixture was transferred to a reaction vessel equipped with a thermometer, a stirrer and a nitrogen inlet tube, and after purging with nitrogen, the mixture was caused to react at 50° C. for 10 hours under stirring. After the end of the reaction, the resultant was separated by filtration and then dried, affording polyurethane urea resin particles (P-24).

[Production of Polyurethane Urea Resin Composition (C-24)]

Polyurethane urea resin composition (C-24) was obtained in the same way as in Example 20 except that the polyurethane urea resin particles (P-20) were replaced by polyurethane urea resin particles (P-24) in [Production of polyurethane urea resin composition (C-20)] in Example 20.

Example 25

Production of Strength Enhancing Agent

Into a reaction vessel equipped with a cooling tube, a stirrer, and a nitrogen inlet tube were charged 384 parts of trimellitic anhydride and 62 parts of ethylene glycol, which were then allowed to react at 140° C. for 5 hours. In addition, 432 parts of benzyl alcohol was allowed to react at 180° C. for 5 hours with removal by distillation of the water generated. Thus, a strength enhancing agent was obtained.

[Production of Polyurethane Urea Resin Composition (C-25)]

Polyurethane urea resin composition (C-25) was obtained in the same way as in Example 20 except for charging 2 parts of the strength enhancing agent prepared as above together with the (P-20) in [Production of polyurethane urea resin composition (C-20)] in Example 20.

For the polyurethane urea resin compositions (C-20), (C-24), and (C-25) obtained in Examples 20, 24, and 25, the results of the measurement of physical properties by the methods described below are shown in Table 8.

<Preparation of Skin>

Polyurethane urea resin particles for slush molding were filled into a grain-patterned Ni electrocast mold that had beforehand been heated to 210° C., and 10 seconds later, excess resin particles were discharged. Sixty seconds later, the mold was cooled with water to prepare a skin (1.0 mm thick). A 0.3 mm thick skin was prepared in the same way as described above except for discharging excess resin particle 5 seconds after the filling.

<Rear Surface Meltability>

For a skin of 1 mm in thickness, the center of the rear surface of the molded skin was observed visually and the meltability was evaluated according to the following criteria.

5: It is uniform and gloss is observed.

4: Some powder remains unmelted but gloss is observed.

3: Irregularities are on the overall rear surface and no gloss is observed. There is no pinhole penetrating to the front surface.

2: There are irregularities of the shape of powder on the overall rear surface, and there are pinholes penetrating to the front surface.

1: The powder does not melt, failing to form a molded article.

<Method for Measuring Tensile Strength, Elongation, and Maximum Load at Break>

From a 1 mm thick molded skin were punched out three tensile test specimens of the dumbbell No. 1 type of JIS K6400-5, and marking lines were drawn at intervals of 40 mm on the center of each specimen. The minimum value of thickness taken at five positions located between marked lines was adopted as the sheet thickness. Each of the test pieces was attached to an autograph under a 25° C. atmosphere and was pulled at a rate of 200 mm/min. The tensile strength and the elongation achieved before the test piece broke were measured. The same measurement was performed for a 0.3 mm thick skin and the maximum load at break achieved before the test piece broke in the above-described test was calculated.

<Abrasion Resistance>

A 1 mm thick molded skin was cut into a piece having a width of 30 mm and a length of 200 mm. The piece was attached to a plane abrasion tester (manufactured by Suga Test Instruments Co., Ltd.; model No.: FR-T), and its abrader was covered with a white cotton cloth, and then the cloth was fixed. A abrasion resistance test was performed by reciprocating the test piece 3,000 times under a load applied by the abrader of 0.5 kgf. Evaluation was performed according to the following criteria.

⊙: No abnormalities are observed.

◯: Slight abnormalities are observed but are not noticeable.

Δ: Abnormalities are observed and are visible clearly.

<Method of Measuring Tensile Strength and Elongation after Heat Resistance Test>

A 1 mm thick molded skin was left at rest at 130° C. for 600 hours in a wind-circulating drier. Subsequently, the treated skin was left at rest at 25° C. for 24 hours. Subsequently, from the skin were punched out three tensile test specimens of the dumbbell No. 1 type of JIS K6400-5, and marking lines were drawn at intervals of 40 mm on the center of each specimen. The minimum value of thickness taken at five positions located between marked lines was adopted as the sheet thickness. Each of the test pieces was attached to an autograph under a 25° C. atmosphere and was pulled at a rate of 200 mm/min. The tensile strength and the elongation achieved before the specimen broke were measured.

TABLE 8

|  |  | Example 20 | Example 24 | Example 25 |
|---|---|---|---|---|
| Rear surface meltability | Grade | 4 | 5 | 5 |
| Tensile strength | MPa | 15 | 22 | 21 |
| Elongation | % | 500 | 550 | 660 |
| Maximum load at break | N | 51 | 78 | 69 |
| Abrasion resistance | — | 3 | 5 | 5 |
| Tensile strength after heat resistance test | MPa | 6 | 14 | 9 |
| Tensile elongation after heat resistance test | % | 360 | 500 | 400 |

INDUSTRIAL APPLICABILITY

The polyurethane urea resin particles of the present invention for slush molding are excellent in low odor, power flowability, thermal meltability, flexibility, and endurance; thus, the particles can be used suitably as a material useful for slush molding.

The invention claimed is:

1. A method for producing the powdery polyurethane urea resin composition for slush molding comprising: a polyurethane urea resin (D) whose total content of a dicondensate of acetone, a dicondensate of methyl ethyl ketone, and a dicondensate of methyl isobutyl ketone is 1,000 ppm or less, and an additive (N),
wherein the polyurethane urea resin (D) has formed thermoplastic polyurethane urea resin particles (P) having irregularities on the surface thereof and having a shape factor SF1 of from 101 to 200, a shape factor SF2 of from 120 to 240, and a volume-average particle diameter of from 20 to 500 μm, the method comprising the step of:
obtaining thermoplastic polyurethane urea resin particles (P) having irregularities on the surface thereof by performing a polymerization reaction,
formation of primary particles having a volume-average particle diameter of 0.1 to 60 μm, and
granulation by coalescence of the primary particles by mixing and stirring a mixture (M) composed of:
an alicyclic diamine and/or an aliphatic diamine (B),
an organic solvent (K) having a dielectric constant of 5 to 25, and
water or an aqueous solution (L) containing a surfactant,
wherein the mixture contains the (K) in an amount of 5 to 30% by weight relative to the (L) or the water, with an isocyanate group-terminated urethane prepolymer (A),
wherein the-additive (N) is added and mixed in any of the step of obtaining the (P) or the step of obtaining the (A) or the raw material thereof before the step of obtaining the (P), or the step after obtaining the (P),
wherein the prepolymer (A) is formed from an aliphatic diisocyanate (a1) and an active hydrogen component comprising a monool (a2), a high molecular diol (a3) having a number-average molecular weight of from 500 to 10,000 and an active hydrogen-containing compound represented by formula (1):

[Chemical Formula 1]

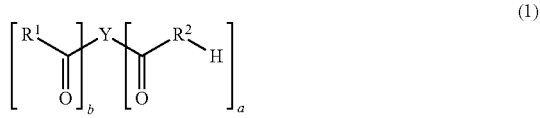

wherein, in formula (1),
$R^1$ represents a monovalent group formed by removing one active hydrogen atom from a monovalent or polyvalent active hydrogen-containing compound, or a hydroxy group; and when there are a plurality of $R^1$s, the $R^1$s each may be the same or different;
$R^2$ represents a divalent group formed by removing two active hydrogen atoms from a divalent active hydrogen-containing compound, and when there are a plurality of $R^2$s, the $R^2$s each may be the same or different;
Y represents a tri- or more valent group formed by removing all carboxyl groups from a tri- or more basic aromatic polycarboxylic acid;
the aromatic ring of Y is constituted from carbon atoms, wherein a substituent, may be attached to any of the carbon atoms, and at least one of the carbon atoms has thereon no substituents attached thereto;
each substituent on the aromatic ring of Y, when present, is independently an alkyl group, a vinyl group, an allyl group, an amino group, or a halogen atom;
a represents an integer of 1 or greater,
b represents an integer of 0 or greater, and $3 \leq a+b \leq d-1$ is satisfied, where d represents the number of hydrogen atoms bound to the carbon atoms constituting the aromatic ring in the event that all substituents including the carboxyl groups of the aromatic polycarboxylic acid have been substituted with hydrogen atoms, that is, the number of the sites that can be substituted on the aromatic ring.

2. The production method according to claim 1, wherein the mixture (M) and the prepolymer (A) are mixed with each other and stirred at a peripheral speed of 10 to 40 m/s.

3. A method for producing the powdery polyurethane urea resin composition for slush molding comprising a polyurethane urea resin (D) whose total content of a dicondensate of acetone, a dicondensate of methyl ethyl ketone, and a dicondensate of methyl isobutyl ketone is 1,000 ppm or less, and an additive (N), wherein the polyurethane urea resin (D) has formed thermoplastic polyurethane urea resin particles (P) having irregularities on the surface thereof and having a shape factor SF1 of from 101 to 200, a shape factor SF2 of from 120 to 240, and a volume-average particle diameter of from 20 to 500 μm, the method comprising the following step 1 and the following step 2-1 or step 2-2:
step 1:
the step of producing polyurethane urea resin fine particles (G) having a volume-average particle diameter of 0.1 to 60 µm comprising the polyurethane urea resin (D) whose total content of a dicondensate of acetone, a dicondensate of methyl ethyl ketone, and a dicondensate of methyl isobutyl ketone is 1,000 ppm or less;

step 2-1:

the step of obtaining thermoplastic polyurethane urea resin particles (P) having irregularities on the surfaces thereof by causing coalescence of the polyurethane urea resin fine particles (G) by heating the (G) to a temperature of from [the thermally softening temperature of the (D)−10]° C. to [the thermally softening temperature of the (D)+10]° C. under stirring at a peripheral speed of 0.5 to 50 m/s;

step 2-2:

the step of obtaining thermoplastic polyurethane urea resin particles (P) having irregularities on the surfaces thereof by causing coalescence of the (G) by heating the (G) to a temperature of from 70° C. to [the thermally softening temperature of the (D)+10]° C. under stirring at a peripheral speed of 0.5 to 50 m/s in the presence of 5 to 30% by weight, based on the weight of the (G), of an organic solvent (T) having a solubility parameter differing by 3 or less from that of the polyurethane urea resin (D);

wherein the additive (N) is added and mixed in any of the step 1, or the step 2-1 or step 2-2, or the step of obtaining a raw material of the (D) before the step 1, or the step after obtaining the resin particles (P), wherein the polyurethane urea resin (D) is a polyurethane urea resin obtained by a production method comprising the step of mixing and stirring a mixture of an alicyclic diamine and/or an aliphatic diamine (B) and an aqueous solution (L) containing a surfactant, or water with an isocyanate group-terminated urethane prepolymer (A), wherein the prepolymer (A) is formed from an aliphatic diisocyanate (a1) and an active hydrogen component comprising a monool (a2), a high molecular diol (a3) having a number-average molecular weight of from 500 to 10,000 and an active hydrogen-containing compound represented by formula (1):

[Chemical Formula 1]

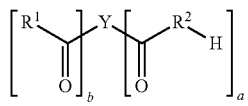

(1)

wherein, in formula (1),

R¹ represents a monovalent group formed by removing one active hydrogen atom from a monovalent or polyvalent active hydrogen-containing compound, or a hydroxy group; and when there are a plurality of R¹s, the R¹s each may be the same or different;

R² represents a divalent group formed by removing two active hydrogen atoms from a divalent active hydrogen-containing compound, and when there are a plurality of R²s, the R²s each may be the same or different;

Y represents a tri- or more valent group formed by removing all carboxyl groups from a tri- or more basic aromatic polycarboxylic acid;

the aromatic ring of Y is constituted from carbon atoms, wherein a substituent may be attached to any of the carbon atoms, and at least one of the carbon atoms has thereon no substituents attached thereto;

each substituent on the aromatic ring of Y, when present, is independently an alkyl group, a vinyl group, an allyl group, an amino group, or a halogen atom;

a represents an integer of 1 or greater, b represents an integer of 0 or greater, and 3≤a+b≤d−1 is satisfied, where d represents the number of hydrogen atoms bound to the carbon atoms constituting the aromatic ring in the event that all substituents including the carboxyl groups of the aromatic polycarboxylic acid have been substituted with hydrogen atoms, that is, the number of the sites that can be substituted on the aromatic ring.

4. A method for producing the powdery polyurethane urea resin composition for slush molding comprising a polyurethane urea resin (D) whose total content of a dicondensate of acetone, a dicondensate of methyl ethyl ketone, and a dicondensate of methyl isobutyl ketone is 1,000 ppm or less, and an additive (N), wherein the polyurethane urea resin (D) has formed thermoplastic polyurethane urea resin particles (P) having irregularities on the surface thereof and having a shape factor SF1 of from 101 to 200, a shape factor SF2 of from 120 to 240, and a volume-average particle diameter of from 20 to 500 µm, the method comprising the following step 3 and step 4:

step 3:

the step of producing polyurethane urea resin fine particles (G) having a volume-average particle diameter of 0.1 to 60 µm comprising the polyurethane urea resin (D) whose total content of a dicondensate of acetone, a dicondensate of methyl ethyl ketone, and a dicondensate of methyl isobutyl ketone is 1,000 ppm or less, and then producing a slurry (R) comprising the (G) and an aqueous solution (L) containing a surfactant, or water;

step 4:

the step of obtaining thermoplastic polyurethane urea resin particles (P) having irregularities on the surface thereof by causing coalescence of the polyurethane urea resin fine particles (G) by adding an organic solvent (T) having a solubility parameter differing by 3 or less from that of the polyurethane urea resin (D) to the slurry (R) and then stirring at a temperature of 10° C. or higher at a peripheral speed of 0.1 to 10 m/s;

wherein the additive (N) is added and mixed in any of the step 3 or the step 4, or the step of obtaining a raw material of the (D) before the step 3, or a step after obtaining the resin particles (P), wherein the polyurethane urea resin (D) is a polyurethane urea resin obtained by a production method comprising the step of mixing and stirring a mixture of an alicyclic diamine and/or an aliphatic diamine (B) and an aqueous solution (L) containing a surfactant, or water with an isocyanate group-terminated urethane prepolymer (A), wherein the prepolymer (A) is formed from an aliphatic diisocyanate (a1) and an active hydrogen component comprising a monool (a2), a high molecular diol (a3) having a number-average molecular weight of from 500 to 10,000 and an active hydrogen-containing compound represented by formula (1):

[Chemical Formula 1]

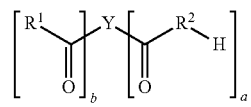

(1)

wherein, in formula (1),
- R¹ represents a monovalent group formed by removing one active hydrogen atom from a monovalent or polyvalent active hydrogen-containing compound, or a hydroxy group; and when there are a plurality of R¹s, the R¹s each may be the same or different;
- R² represents a divalent group formed by removing two active hydrogen atoms from a divalent active hydrogen-containing compound, and when there are a plurality of R²s, the R²s each may be the same or different;
- Y represents a tri- or more valent group formed by removing all carboxyl groups from a tri- or more the aromatic ring of Y is constituted from carbon atoms, wherein a substituent, may be attached to any of the carbon atoms, and at least one of the carbon atoms has thereon no substituents attached thereto;
- each substituent on the aromatic ring of Y, when present, is independently an alkyl group, a vinyl group, an allyl group, an amino group, or a halogen atom;
- a represents an integer of 1 or greater,
- b represents an integer of 0 or greater, and $3 \leq a+b \leq d-1$ is satisfied, where d represents the number of hydrogen atoms bound to the carbon atoms constituting the aromatic ring in the event that all substituents including the carboxyl groups of the aromatic polycarboxylic acid have been substituted with hydrogen atoms, that is, the number of the sites that can be substituted on the aromatic ring.

5. The production method according to claim 1, wherein the method comprises, after obtaining the thermoplastic polyurethane urea resin particles (P) having irregularities on the surface thereof, mixing pigment particles (E), pigment-dispersed resin particles (SE) that are particles composed of a resin (S) in which the pigment particles (E) are dispersed, and/or oil-absorbing inorganic fine particles in which a releasing agent has beforehand been absorbed in inorganic fine particles having a volume-average particle diameter of from 0.1 to 5 μm as the additive (N), thereby adhering the pigment particles (E), the pigment dispersion resin particles (SE), and/or the oil-absorbing inorganic fine particles to the surface of the (P).

6. The production method according to claim 5, wherein the method comprises mixing an organic compound (H), as an additional additive (N), having a melting point of 0° C. or lower, a boiling point of 170° C. or higher, and containing at least one ester group in the molecule thereof before or simultaneously with mixing the thermoplastic polyurethane urea resin particles (P) having irregularities on the surface thereof with the pigment particles (E), the pigment-dispersed resin particles (SE), and/or the oil-absorbing inorganic fine particles, thereby impregnating the (P) with the organic compound (H).

7. The production method according to claim 1, wherein the method comprises, after obtaining the thermoplastic polyurethane urea resin particles (P) having irregularities on the surfaces thereof, mixing, as the additive (N), a pigment dispersion liquid (HE) in which pigment particles (E) have been dispersed in an organic compound (H) having a melting point of 0° C. or lower, a boiling point of 170° C. or higher, and containing at least one ester group in the molecule thereof, thereby impregnating the (P) with the organic compound (H) and adhering the pigment particles (E) to the surface of the (P).

* * * * *